United States Patent
Lin et al.

(10) Patent No.: US 11,451,154 B2
(45) Date of Patent: Sep. 20, 2022

(54) FLYBACK CONVERTER WITH A VARIABLE FREQUENCY DISCONTINUOUS MODE AND VALLEY SENSING

(71) Applicant: RICHTEK TECHNOLOGY CORPORATION, Hsinchu (TW)

(72) Inventors: Kun-Yu Lin, Pingtung (TW);
Tzu-Chen Lin, Changhua (TW);
Wei-Hsu Chang, Hsinchu (TW);
Ta-Yung Yang, Taoyuan (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 17/334,745

(22) Filed: May 30, 2021

(65) Prior Publication Data

US 2021/0376734 A1    Dec. 2, 2021

Related U.S. Application Data

(60) Provisional application No. 63/033,771, filed on Jun. 2, 2020.

(30) Foreign Application Priority Data

Nov. 10, 2020   (TW) .............................. 109139182

(51) Int. Cl.
*H02M 3/335* (2006.01)
*H02M 1/38* (2007.01)

(52) U.S. Cl.
CPC ......... *H02M 3/33515* (2013.01); *H02M 1/38* (2013.01); *H02M 3/33507* (2013.01)

(58) Field of Classification Search
CPC ............................................... H02M 3/335–42
See application file for complete search history.

(56) References Cited

U.S. PATENT DOCUMENTS

| | | | |
|---|---|---|---|
| 8,391,027 B2 | 3/2013 | Lidak et al. | |
| 9,929,657 B2 | 3/2018 | Hsu et al. | |
| 10,056,842 B2 | 8/2018 | Cannenterre et al. | |
| 10,355,606 B2 | 7/2019 | Cannenterre et al. | |
| 2013/0285751 A1* | 10/2013 | Dhanasekaran | H03F 3/21 330/297 |
| 2016/0141966 A1* | 5/2016 | Huang | H02M 3/33523 363/21.15 |
| 2017/0212632 A1* | 7/2017 | Shi | H02M 3/33523 |

* cited by examiner

*Primary Examiner* — Peter M Novak
(74) *Attorney, Agent, or Firm* — Tung & Associates

(57) ABSTRACT

A flyback power converter circuit includes: a power transformer, a primary side switch and a conversion control circuit. In a DCM, during a dead time, the conversion control circuit calculates an upper limit frequency corresponding to output current according to a frequency upper limit function, and obtains a frequency upper limit masking period according to a reciprocal of the upper limit frequency, wherein the frequency upper limit masking period is a period starting from when the primary side switch is turned ON. During an upper limit selection period, the conversion control circuit selects a valley among one or more valleys in a ringing signal related to a voltage across the primary side switch as an upper limit locked valley, so that the conversion control circuit once again turns ON the primary side switch at a beginning time point of the upper limit locked valley.

50 Claims, 20 Drawing Sheets

FLYBACK CONVERTER WITH A VARIABLE FREQUENCY DISCONTINUOUS MODE AND VALLEY SENSING

CROSS REFERENCE

The present invention claims priority to U.S. 63/033,771 filed on Jun. 2, 2020 and claims priority to TW 109139182 filed on Nov. 10, 2020.

BACKGROUND OF THE INVENTION

Field of Invention

The present invention relates to a flyback power converter circuit; particularly, it relates to such flyback power converter circuit wherein its primary side switch can achieve valley switching. The present invention also relates to a conversion control circuit and a control method of such flyback power converter circuit.

Description of Related Art

One type of conventional flyback power converter circuit has an operation mode wherein a switching frequency of its power switch can be adjusted based upon load condition. For example, when the load condition decreases, the switching frequency of a primary side switch is adaptively decreased, to reduce the switching loss of the primary side switch. Please refer to FIG. 1A, which shows a characteristic curve of switching frequency versus output current in a conventional flyback power converter circuit. As shown in FIG. 1A, when the output current is in a range between a frequency reduction lower current limit Io_low and a frequency reduction current upper limit Io_high, the switching frequency is adaptively adjusted to be between a switching frequency minimum fmin and a switching frequency maximum fmax, and the switching frequency is proportional to the output current.

In other words, when the output current is between the frequency reduction lower current limit Io_low and the frequency reduction current upper limit Io_high, as the load condition becomes heavier, the output current correspondingly becomes higher, and the switching frequency of the power switch becomes higher. On the contrary, as the load condition becomes lighter, the output current correspondingly becomes lower, and the switching frequency of the power switch becomes lower, thus reducing the switching loss of the primary side switch. The switching frequency is controlled to be in a range between the switching frequency minimum fmin and the switching frequency maximum fmax for the purpose to prevent unwanted audio noise caused by operating the primary side switch at a switching frequency smaller than the switching frequency minimum fmin and for the purpose to prevent undesirably switching loss of the primary side switch caused by operating the primary side switch at a switching frequency higher than the switching frequency maximum fmax from occurring.

Please refer to FIG. 1B, which shows signal waveforms of a voltage Vds across a primary side switch and a switching signal S1C operating the primary side switch, in a conventional flyback power converter circuit. When the primary side switch is turned OFF (i.e., the switching signal S1C is at low level), a secondary side current flowing through a secondary side winding decreases. After the secondary side current decreases to zero, a parasitic capacitor of the primary side switch and a primary side winding will constitute an inductor-capacitor oscillator circuit. As a consequence, during a dead time Tdead which is between a time point toff at which the secondary side current drops to zero and a time point (e.g., ts1 or ts2) at which the primary side switch begins to be turned ON in a next cycle, the voltage Vds across the primary side switch will present a ringing waveform (referred to as ringing signal Sring). As shown in FIG. 1B, the ringing signal Sring oscillates between valleys v1, v2, v3 and v4 and peaks p1, p2 and p3.

When the output current is reduced due to reduced load condition, as shown in FIG. 1A and FIG. 1B, the switching period will be changed from T1 to T2. During the switching period T2, the output current is relatively smaller and the switching frequency is relatively smaller. As shown in FIG. 1B, the switching period T2 is longer than the switching period T1. In a case where the switching frequency is adaptively adjusted according to the output current, as shown in FIG. 1B, it is possible that the turned-ON time point of the primary side switch does not occur at the valleys v1, v2, v3 and v4. For example, as shown in FIG. 1B, the turned-ON time point ts1 or ts2 of the primary side switch does not occur at the valleys v1, v2, v3 and v4. Under such situation, as compared to a situation where the turned-ON time point of the primary side switch occurs exactly at the time point of the valleys v1, v2, v3 or v4, there is higher switching loss.

The following prior arts are relevant to the present invention: U.S. Pat. Nos. 8,391,027, 9,929,657, 10,056,842 and 10,355,606.

In view of the above, to overcome the drawbacks in the prior art, the present invention proposes a flyback power converter circuit, and a conversion control circuit and a control method thereof, which are capable of achieving valley switching of the primary side switch, to thereby reduce power loss, enhance power conversion efficiency, and relieve frequency hopping issue.

SUMMARY OF THE INVENTION

From one perspective, the present invention provides a flyback power converter circuit, which is configured to operably convert an input power to an output power, so as to supply the output power to a load circuit, wherein the input power includes an input voltage and an input current, whereas, the output power includes an output voltage and an output current; the flyback power converter circuit comprising: a power transformer, which is coupled between the input voltage and the output voltage via electromagnetic induction, wherein the power transformer includes: a primary side winding coupled to the input voltage and a secondary side winding coupled to the output voltage; a primary side switch coupled to the primary side winding, wherein the primary side switch is configured to operably control the primary side winding, so as to convert the input voltage, whereby the secondary side winding generates the output voltage; and a conversion control circuit, which is configured to operably generate a switching signal according to a feedback compensation signal, so as to control the primary side switch, thus controlling the primary side winding; wherein in a discontinuous conduction mode (DCM), during a dead time, the conversion control circuit is configured to operably calculate an upper limit frequency corresponding to the output current according to a frequency upper limit function, and to operably obtain a frequency upper limit masking period according to a reciprocal of the upper limit frequency, wherein the frequency upper limit masking period is a period starting from a time point at which the primary side switch begins to be turned ON; and wherein during an upper limit selection period, the conversion control circuit is configured to operably select a valley among one or more valleys in a ringing signal related to a voltage across the primary side switch as an upper limit locked valley, so that the conversion control circuit once again turns ON the primary side switch at an occurrence time point of the upper limit locked valley, wherein the upper limit selection period is a period starting from a time point at which the frequency upper limit masking period ends; wherein the frequency upper limit masking period is inversely correlated to a level of the output current; wherein a switching period is defined as a period between turned-ON time points of the primary side switch at two immediately consecutive cycles; wherein the conversion control circuit is configured to operably adjust an ON period of the primary side switch according to the feedback compensation signal, so as to regulate the output voltage or the output current; wherein a reciprocal of the switching period is defined as a switching frequency, and wherein the switching frequency is not higher than the upper limit frequency in the DCM.

From another perspective, the present invention provides a conversion control circuit for use in a flyback power converter circuit, wherein the flyback power converter circuit is configured to operably generate a switching signal for controlling a primary side switch, so as to control the primary side winding of a power transformer of the flyback power converter circuit, thereby converting an input power to an output power at a secondary side winding of the power transformer; the conversion control circuit comprising: a frequency upper limit masking circuit, which is configured to operably obtain a turned-ON time point according to the switching signal, wherein in a discontinuous conduction mode (DCM), during a dead time, the frequency upper limit masking circuit is configured to operably obtain a frequency upper limit masking period according to a reciprocal of the upper limit frequency, so as to generate a frequency upper limit masking signal, wherein the frequency upper limit masking period is a period starting from a time point at which the primary side switch begins to be turned ON; a valley detection circuit, which is configured to operably generate a valley detection signal according to a ringing signal related to a voltage across the primary side switch, wherein the valley detection signal is indicative of an occurrence time point of at least one valley in the ringing signal during the dead time; an upper limit determination circuit, which is configured to operably select a valley of a predetermined serial number as the occurrence time point of the upper limit locked valley according to the frequency upper limit masking signal and the valley detection signal during an upper limit selection period, so as to generate an upper limit determination signal, wherein the upper limit selection period is a period starting from a time point at which the frequency upper limit masking period ends; and a switching signal generation circuit, which is configured to operably compare the feedback compensation signal with a ramp signal, so as to generate a reset signal, wherein the switching signal generation circuit is configured to operably generate the switching signal according to the reset signal and the upper limit determination signal, so that the conversion control circuit once again turns ON the primary side switch at an occurrence time point of the upper limit locked valley; wherein the frequency upper limit masking period is inversely correlated to a level of the output current; wherein a switching period is defined as a period between turned-ON time points of the primary side switch at two immediately consecutive cycles; wherein the conversion control circuit is configured to operably adjust an ON period of the primary side switch according to the feedback compensation signal, so as to regulate the output voltage or the output current; wherein a reciprocal of the switching period is defined as a switching frequency, and wherein the switching frequency is not higher than the upper limit frequency in the DCM.

From yet another perspective, the present invention provides a control method, which is configured to operably control a flyback power converter circuit, so that an input power is converted to an output power, thus supplying the output power to a load circuit; the control method comprising: generating a switching signal according to a feedback compensation signal, so as to control the primary side switch and thereby controlling the primary side winding, to convert the input power to the output power at a secondary side winding of the power transformer; in a case wherein the flyback power converter circuit operates in a discontinuous conduction mode (DCM), during a dead time in the DCM, calculating an upper limit frequency corresponding to the output current according to a frequency upper limit function, and obtaining a frequency upper limit masking period according to a reciprocal of the upper limit frequency, wherein the frequency upper limit masking period is a period starting from a time point at which the primary side switch begins to be turned ON; during an upper limit selection period, selecting a valley among one or more valleys in a ringing signal related to a voltage across the primary side switch as an upper limit locked valley, so as to once again turn ON the primary side switch at an occurrence time point of the upper limit locked valley, wherein the upper limit selection period is a period starting from a time point at which the frequency upper limit masking period ends; and adjusting an ON period of the primary side switch according to the feedback compensation signal, so as to regulate the output voltage or the output current; wherein the frequency upper limit masking period is inversely correlated to a level of the output current; wherein a switching period is defined as a period between turned-ON time points of the primary side switch at two immediately consecutive cycles; wherein a reciprocal of the switching period is defined as a switching frequency, and wherein the switching frequency is not higher than the upper limit frequency in the DCM.

From still another perspective, the present invention provides a flyback power converter circuit, which is configured to operably convert an input power to an output power, so as to supply the output power to a load circuit, wherein the input power includes an input voltage and an input current, whereas, the output power includes an output voltage and an output current; the flyback power converter circuit comprising: a power transformer, which is coupled between the input voltage and the output voltage via electromagnetic induction, wherein the power transformer includes a primary side winding coupled to the input voltage and a secondary side winding coupled to the output voltage; a primary side switch coupled to the primary side winding, wherein the primary side switch is configured to operably control the primary side winding, so as to convert the input voltage, whereby the secondary side winding generates the output voltage; and a conversion control circuit, which is configured to operably generate a switching signal according to a feedback compensation signal, so as to control the primary side switch, thus controlling the primary side winding; wherein in a discontinuous conduction mode (DCM), during a dead time, the conversion control circuit is configured to operably calculate a lower limit frequency corresponding to the output current according to a frequency lower limit function, and to operably obtain a frequency lower limit masking period according to a reciprocal of the lower limit frequency, wherein the frequency lower limit masking period is a period starting from a time point at which the primary side switch begins to be turned ON; and wherein during a lower limit selection period, the conversion control circuit is configured to operably select a valley among one or more valleys in a ringing signal related to a voltage across the primary side switch as a lower limit locked valley, so that the conversion control circuit once again turns ON the primary side switch at an occurrence time point of the lower limit locked valley, wherein the lower limit selection period is a period prior to a time point at which the frequency lower limit masking period ends; wherein the frequency lower limit masking period is inversely correlated to a level of the output current; wherein a switching period is defined as a period between turned-ON time points of the primary side switch at two immediately consecutive cycles; wherein the conversion control circuit is configured to operably adjust an ON period of the primary side switch according to the feedback compensation signal, so as to regulate the output voltage or the output current; wherein a reciprocal of the switching period is defined as a switching frequency, and wherein the switching frequency is not lower than the lower limit frequency in the DCM.

From still another perspective, the present invention provides a conversion control circuit for use in a flyback power converter circuit, wherein the flyback power converter circuit is configured to operably generate a switching signal for controlling a primary side switch, so as to control the primary side winding of a power transformer of the flyback power converter circuit, thereby converting an input power to an output power at a secondary side winding of the power transformer; the conversion control circuit comprising: a frequency lower limit masking circuit, which is configured to operably obtain a turned-ON time point according to the switching signal, wherein in a discontinuous conduction mode (DCM), during a dead time, the frequency lower limit masking circuit is configured to operably obtain a frequency lower limit masking period according to a reciprocal of the lower limit frequency, so as to generate a frequency lower limit masking signal, wherein the frequency lower limit masking period is a period starting from a time point at which the primary side switch begins to be turned ON; a valley detection circuit, which is configured to operably generate a valley detection signal according to a ringing signal related to a voltage across the primary side switch, wherein the valley detection signal is indicative of an occurrence time point of at least one valley in the ringing signal during the dead time; a lower limit determination circuit, which is configured to operably select a valley of a predetermined serial number as the occurrence time point of the lower limit locked valley according to the frequency lower limit masking signal and the valley detection signal during a lower limit selection period, so as to generate a lower limit determination signal, wherein the lower limit selection period is a period prior to a time point at which the frequency lower limit masking period ends; and a switching signal generation circuit, which is configured to operably compare the feedback compensation signal with a ramp signal, so as to generate a reset signal, and to operably generate the switching signal according to the reset signal and the lower limit determination signal, so that the conversion control circuit once again turns ON the primary side switch at an occurrence time point of the lower limit locked valley; wherein the frequency lower limit masking period is inversely correlated to a level of the output current; wherein a switching period is defined as a period between turned-ON time points of the primary side switch at two immediately consecutive cycles; wherein the conversion control circuit is configured to operably adjust an ON period of the primary side switch according to the feedback compensation signal, so as to regulate the output voltage or the output current; wherein a reciprocal of the switching period is defined as a switching frequency, and wherein the switching frequency is not lower than the lower limit frequency in the DCM.

From still another perspective, the present invention provides a control method, which is configured to operably control a flyback power converter circuit, so that an input power is converted to an output power, thus supplying the output power to a load circuit; the control method comprising: generating a switching signal according to a feedback compensation signal, so as to control the primary side switch and thereby controlling the primary side winding, to convert the input power to the output power at a secondary side winding of the power transformer; in a case wherein the flyback power converter circuit operates in a discontinuous conduction mode (DCM), during a dead time in the DCM, calculating a lower limit frequency corresponding to the output current according to a frequency lower limit function, and obtaining a frequency lower limit masking period according to a reciprocal of the lower limit frequency, wherein the frequency lower limit masking period is a period starting from a time point at which the primary side switch begins to be turned ON; during a lower limit selection period, selecting a valley among one or more valleys in a ringing signal related to a voltage across the primary side switch as a lower limit locked valley, so as to once again turn ON the primary side switch at an occurrence time point of the lower limit locked valley, wherein the lower limit selection period is a period prior to a time point at which the frequency lower limit masking period ends; and adjusting an ON period of the primary side switch according to the feedback compensation signal, so as to regulate the output voltage or the output current; wherein the frequency lower limit masking period is inversely correlated to a level of the output current; wherein a switching period is defined as a period between turned-ON time points of the primary side switch at two immediately consecutive cycles; wherein a reciprocal of the switching period is defined as a switching frequency, and wherein the switching frequency is not lower than the lower limit frequency in the DCM.

From still another perspective, the present invention provides a flyback power converter circuit, which is configured to operably convert an input power to an output power, so as to supply the output power to a load circuit, wherein the input power includes an input voltage and an input current, whereas, the output power includes an output voltage and an output current; the flyback power converter circuit comprising: a power transformer, which is coupled between the input voltage and the output voltage via electromagnetic induction, wherein the power transformer includes: a primary side winding coupled to the input voltage and a secondary side winding coupled to the output voltage; a primary side switch coupled to the primary side winding, wherein the primary side switch is configured to operably control the primary side winding, so as to convert the input voltage, whereby the secondary side winding generates the output voltage; and a conversion control circuit, which is configured to operably generate a switching signal according to a feedback compensation signal, so as to control the primary side switch, thus controlling the primary side winding; wherein in a discontinuous conduction mode (DCM), during a dead time, the conversion control circuit is configured to operably calculate an upper limit frequency corresponding to the output current according to a frequency upper limit function, and to operably obtain a frequency upper limit masking period according to a reciprocal of the upper limit frequency, wherein the frequency upper limit masking period is a period starting from a time point at which the primary side switch begins to be turned ON; wherein in DCM, during the dead time, the conversion control circuit is configured to operably calculate a lower limit frequency corresponding to the output current according to a frequency lower limit function, and to operably obtain a frequency lower limit masking period according to a reciprocal of the lower limit frequency, wherein the frequency lower limit masking period is a period starting from a time point at which the primary side switch begins to be turned ON; wherein the frequency upper limit masking period is inversely correlated to a level of the output current; wherein the frequency lower limit masking period is inversely correlated to the level of the output current; wherein a switching period is defined as a period between turned-ON time points of the primary side switch at two immediately consecutive cycles; wherein the conversion control circuit is configured to operably adjust an ON period of the primary side switch according to the feedback compensation signal, so as to regulate the output voltage or the output current; wherein a reciprocal of the switching period is defined as a switching frequency, and wherein the switching frequency is not higher than the upper limit frequency in the DCM; wherein the switching frequency is not lower than the lower limit frequency in the DCM; wherein when an occurrence number of one or more valleys in a ringing signal related to a voltage across the primary side switch during the frequency upper limit masking period is not lower than an occurrence number of one or more valleys in the ringing signal during a previous frequency upper limit masking period in a previous switching period, during an upper limit selection period, the conversion control circuit is configured to operably select a valley among the one or more valleys in the ringing signal of the present switching period as an upper limit locked valley, so that the conversion control circuit once again turns ON the primary side switch at an occurrence time point of the upper limit locked valley, wherein the upper limit selection period is a period starting from a time point at which the frequency upper limit masking period ends; wherein when an occurrence number of one or more valleys in the ringing signal related to the voltage across the primary side switch during the frequency upper limit masking period is lower than an occurrence number of one or more valleys in the ringing signal during a previous frequency upper limit masking period in a previous switching period, during a lower limit selection period, the conversion control circuit is configured to operably select a valley among the one or more valleys in the ringing signal of the present switching period as a lower limit locked valley, so that the conversion control circuit once again turns ON the primary side switch at an occurrence time point of the lower limit locked valley, wherein the lower limit selection period is a period prior to a time point at which the frequency lower limit masking period ends.

From still another perspective, the present invention provides a conversion control circuit for use in a flyback power converter circuit, wherein the flyback power converter circuit is configured to operably generate a switching signal for controlling a primary side switch, so as to control the primary side winding of a power transformer of the flyback power converter circuit, thereby converting an input power to an output power at a secondary side winding of the power transformer; the conversion control circuit comprising: a frequency upper limit masking circuit, which is configured to operably obtain a turned-ON time point according to the switching signal, wherein in a discontinuous conduction mode (DCM), during a dead time, the frequency upper limit masking circuit is configured to operably obtain a frequency upper limit masking period according to a reciprocal of the upper limit frequency, so as to generate a frequency upper limit masking signal, wherein the frequency upper limit masking period is a period starting from a time point at which the primary side switch begins to be turned ON; a frequency lower limit masking circuit, which is configured to operably obtain the turned-ON time point according to the switching signal, wherein in the DCM, during the dead time, the frequency lower limit masking circuit is also configured to operably obtain a frequency lower limit masking period according to a reciprocal of the lower limit frequency, so as to generate a frequency lower limit masking signal, wherein the frequency lower limit masking period is a period starting from the time point at which the primary side switch begins to be turned ON; a valley detection circuit, which is configured to operably generate a valley detection signal according to a ringing signal related to a voltage across the primary side switch, wherein the valley detection signal is indicative of an occurrence time point of at least one valley in the ringing signal during the dead time; a determination circuit, which is configured to operably determine whether the occurrence number of one or more valleys in the ringing signal during the frequency upper limit masking period is lower than the occurrence number of valleys in the ringing signal during a previous switching period according to the frequency upper limit masking signal, the frequency lower limit masking signal and the valley detection signal, so as to generate a determination signal; a switching signal generation circuit, which is configured to operably compare the feedback compensation signal with a ramp signal, so as to generate a reset signal, wherein the switching signal generation circuit is configured to operably generate the switching signal according to the reset signal and the determination signal, so that the conversion control circuit once again turns ON the primary side switch at an occurrence time point of the upper limit locked valley; wherein the frequency upper limit masking period is inversely correlated to a level of the output current; wherein the frequency lower limit masking period is inversely correlated to a level of the output current; wherein a switching period is defined as a period between turned-ON time points of the primary side switch at two immediately consecutive cycles; wherein the conversion control circuit is configured to operably adjust an ON period of the primary side switch according to the feedback compensation signal, so as to regulate the output voltage or the output current; wherein a reciprocal of the switching period is defined as a switching frequency, and wherein the switching frequency is not higher than the upper limit frequency in the DCM; wherein the switching frequency is not lower than the lower limit frequency in the DCM; wherein when an occurrence number of one or more valleys in a ringing signal related to a voltage across the primary side switch during the frequency upper limit masking period is not lower than an occurrence number of valleys in the ringing signal during a previous frequency upper limit masking period in the previous switching period, during an upper limit selection period, the conversion control circuit is configured to operably select a valley among one or more valleys in the ringing signal as an upper limit locked valley, so that the conversion control circuit once again turns ON the primary side switch at an occurrence time point of the upper limit locked valley, wherein the upper limit selection period is a period starting from a time point at which the frequency upper limit masking period ends; wherein when an occurrence number of one or more valleys in the ringing signal during the frequency upper limit masking period is lower than an occurrence number of valleys in the ringing signal during the previous frequency upper limit masking period in the previous switching period, during a lower limit selection period, the conversion control circuit is configured to operably select a valley among one or more valleys in the ringing signal as a lower limit locked valley, so that the conversion control circuit once again turns ON the primary side switch at an occurrence time point of the lower limit locked valley, wherein the lower limit selection period is a period prior to a time point at which the frequency lower limit masking period ends.

From still another perspective, the present invention provides a control method, which is configured to operably control a flyback power converter circuit, so that an input power is converted to an output power, thus supplying the output power to a load circuit; the control method comprising: generating a switching signal according to a feedback compensation signal, so as to control the primary side switch and thereby controlling the primary side winding, to convert the input power to the output power at a secondary side winding of the power transformer; in a case wherein the flyback power converter circuit operates in a discontinuous conduction mode (DCM), during a dead time in the DCM, calculating an upper limit frequency corresponding to the output current according to a frequency upper limit function, and obtaining a frequency upper limit masking period according to a reciprocal of the upper limit frequency, wherein the frequency upper limit masking period is a period starting from a time point at which the primary side switch begins to be turned ON; in a case wherein the flyback power converter circuit operates in a discontinuous conduction mode (DCM), during a dead time in the DCM, calculating a lower limit frequency corresponding to the output current according to a frequency lower limit function, and obtaining a frequency lower limit masking period according to a reciprocal of the lower limit frequency, wherein the frequency lower limit masking period is a period starting from the time point at which the primary side switch begins to be turned ON; wherein when an occurrence number of one or more valleys in a ringing signal related to a voltage across the primary side switch during the frequency upper limit masking period is not lower than an occurrence number of valleys in the ringing signal during a previous frequency upper limit masking period in a previous switching period, during an upper limit selection period, selecting a valley among one or more valleys in the ringing signal as an upper limit locked valley, so that the primary side switch is once again turned ON at an occurrence time point of the upper limit locked valley, wherein the upper limit selection period is a period starting from a time point at which the frequency upper limit masking period ends; wherein when an occurrence number of one or more valleys in the ringing signal during the frequency upper limit masking period is lower than an occurrence number of valleys in the ringing signal during the previous frequency upper limit masking period in the previous switching period, during a lower limit selection period, selecting a valley among one or more valleys in the ringing signal of the voltage across the primary side switch as a lower limit locked valley, so that the primary side switch is once again turned ON at an occurrence time point of the lower limit locked valley, wherein the lower limit selection period is a period prior to a time point at which the frequency lower limit masking period ends; and adjusting an ON period of the primary side switch according to the feedback compensation signal, so as to regulate the output voltage or the output current; wherein the frequency upper limit masking period is inversely correlated to a level of the output current; wherein the frequency lower limit masking period is inversely correlated to a level of the output current; wherein a switching period is defined as a period between turned-ON time points of the primary side switch at two immediately consecutive cycles; wherein the conversion control circuit is configured to operably adjust an ON period of the primary side switch according to the feedback compensation signal, so as to regulate the output voltage or the output current; wherein a reciprocal of the switching period is defined as a switching frequency, and wherein the switching frequency is not higher than the upper limit frequency in the DCM; wherein the switching frequency is not lower than the lower limit frequency in the DCM.

In one embodiment, the flyback power converter circuit further comprises: a feedback circuit, which is configured to operably generate the feedback compensation signal according to the output current; wherein the conversion control circuit is configured to operably determine the frequency upper limit masking period according to the feedback compensation signal.

In one embodiment, the power transformer furtherer includes: an auxiliary winding, which is configured to operably sense the voltage across the primary side switch, so as to generate an auxiliary signal, thereby obtaining information of the ringing signal.

In one embodiment, during the upper limit selection period, the conversion control circuit is configured to operably select a first valley or a valley of a predetermined serial number among the one or more valleys in the ringing signal as the upper limit locked valley.

In one embodiment, the conversion control circuit includes: a frequency upper limit masking circuit, which is configured to operably obtain a turned-ON time point according to the switching signal, and to operably calculate the frequency upper limit masking period according to the feedback compensation signal related to the output current, so as to generate a frequency upper limit masking signal; a valley detection circuit, which is configured to operably generate a valley detection signal according to the ringing signal, wherein the valley detection signal is indicative of an occurrence time point of at least one valley in the ringing signal during the dead time; an upper limit determination circuit, which is configured to operably select a valley of a predetermined serial number as the occurrence time point of the upper limit locked valley according to the frequency upper limit masking signal and the valley detection signal during the upper limit selection period, so as to generate an upper limit determination signal; and a switching signal generation circuit, which is configured to operably compare the feedback compensation signal with a ramp signal, so as to generate a reset signal, and to operably generate the switching signal according to the reset signal and the upper limit determination signal.

In one embodiment, the switching signal generation circuit includes: a comparison circuit, which is configured to operably compare the feedback compensation signal with the ramp signal, so as to generate a comparison signal; wherein the ramp signal is correlated to a primary side current flowing through the primary side winding; and a logic circuit, which is configured to operably generate the switching signal according to the comparison signal and the determination signal.

In one embodiment, the flyback power converter circuit further comprises: a feedback circuit, which is configured to operably generate the feedback compensation signal according to the output current; wherein the conversion control circuit is configured to operably determine the frequency lower limit masking period according to the feedback compensation signal.

In one embodiment, during the lower limit selection period, the conversion control circuit is configured to operably select a first valley or a valley of a predetermined serial number among the one or more valleys in the ringing signal as the lower limit locked valley.

In one embodiment, the conversion control circuit includes: a frequency lower limit masking circuit, which is configured to operably obtain a turned-ON time point of the primary side switch according to the switching signal, wherein the frequency lower limit masking circuit is configured to operably calculate the frequency lower limit masking period according to the feedback compensation signal, so as to generate a frequency lower limit masking signal, wherein the feedback compensation signal is related to the output current; a valley detection circuit, which is configured to operably generate a valley detection signal according to the ringing signal, wherein the valley detection signal is indicative of an occurrence time point of at least one valley in the ringing signal during the dead time; a lower limit determination circuit, which is configured to operably select a valley of a predetermined serial number as the occurrence time point of the lower limit locked valley according to the frequency lower limit masking signal and the valley detection signal during the lower limit selection period, so as to generate a lower limit determination signal; and a switching signal generation circuit, which is configured to operably compare the feedback compensation signal with a ramp signal, so as to generate a reset signal, and to operably generate the switching signal according to the reset signal and the lower limit determination signal.

In one embodiment, when the occurrence number of the one or more valleys in the ringing signal of the voltage across the primary side switch during the frequency upper limit masking period is not lower than the occurrence number of valleys in the ringing signal during the previous frequency upper limit masking period in the previous switching period, during the upper limit selection period, the conversion control circuit is configured to operably select a first valley or a valley of a predetermined serial number among one or more valleys in the ringing signal as the upper limit locked valley; wherein when the occurrence number of the one or more valleys in the ringing signal of the voltage across the primary side switch during the frequency upper limit masking period is lower than the occurrence number of valleys in the ringing signal during the previous frequency upper limit masking period in the previous switching period, during the lower limit selection period, the conversion control circuit is configured to operably select the first valley or the valley of the predetermined serial number among one or more valleys in the ringing signal as the lower limit locked valley.

In one embodiment, the frequency upper limit function and the frequency lower limit function are both linear function of frequency versus output current, and wherein a slope of the frequency upper limit function is greater than a slope of the frequency lower limit function.

In one embodiment, when the occurrence number of the one or more valleys in the ringing signal during the frequency upper limit masking period is lower than the occurrence number of valleys in the ringing signal during the previous frequency upper limit masking period in the previous switching period, the conversion control circuit is configured to operably calculate an auxiliary frequency corresponding to the output current according to a frequency auxiliary function, and to operably obtain a frequency auxiliary masking period according to a reciprocal of the auxiliary frequency, wherein the frequency auxiliary masking period is a period starting from the time point at which the primary side switch begins to be turned ON, and wherein during an auxiliary selection period, the conversion control circuit is configured to operably select the lower limit locked valley, so that the conversion control circuit once again turns ON the primary side switch at the occurrence time point of the lower limit locked valley, wherein the auxiliary selection period is a period starting from a time point at which the frequency auxiliary masking period ends; wherein the frequency auxiliary masking period is between the frequency upper limit masking period and the frequency lower limit masking period.

The objectives, technical details, features, and effects of the present invention will be better understood with regard to the detailed description of the embodiments below, with reference to the attached drawings.

BRIEF DESCRIPTION OF THE DRAWINGS

FIG. 2B shows a characteristic curve of relevant signals of the embodiment shown in FIG. 2A, whereas.

FIG. 9A shows a characteristic curve of relevant signals of the embodiment shown in FIG. 2A wherein another operation mechanism is conducted, whereas.

FIG. 14A shows a characteristic curve of relevant signals of the embodiment shown in FIG. 2A wherein another operation mechanism is conducted, whereas.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
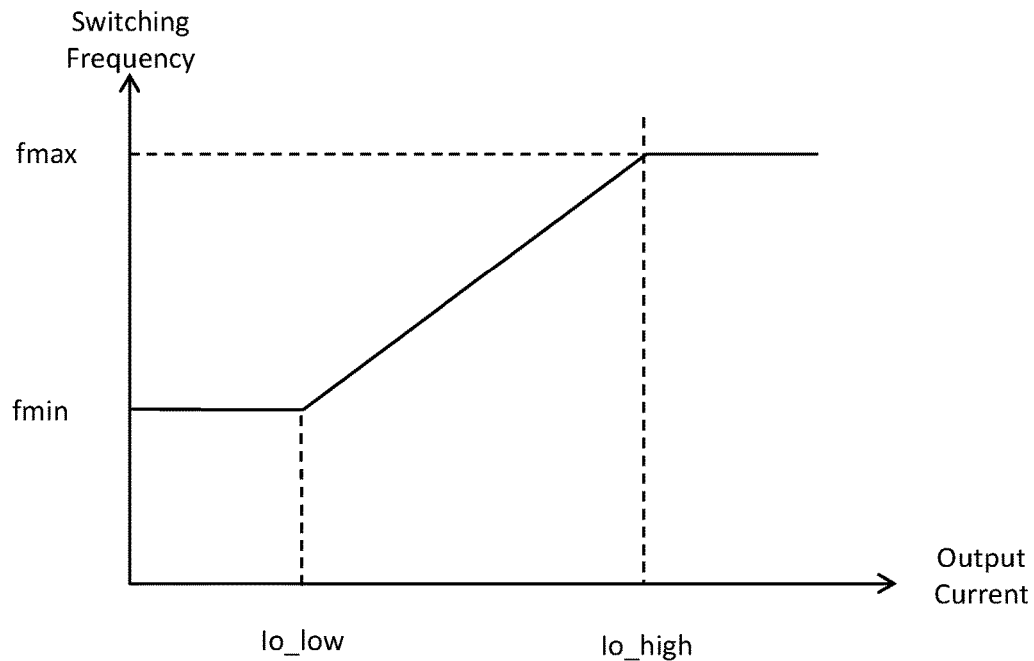
FIG. 1A shows a characteristic curve of switching frequency versus output current in a conventional flyback power converter circuit.
Figure 1B:
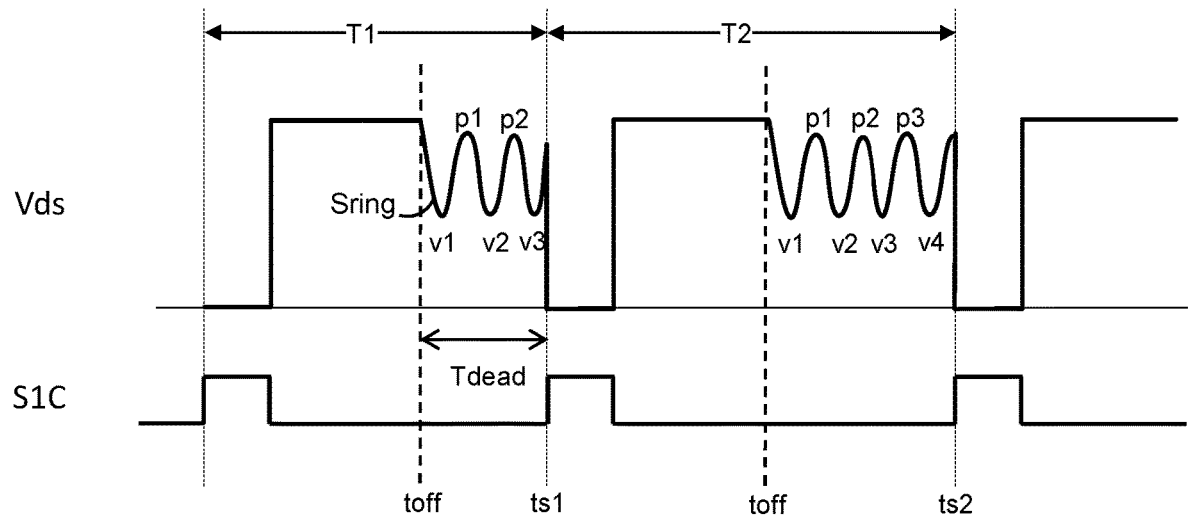
FIG. 1B shows signal waveforms of the voltage Vds across a primary side switch and a switching signal S1C operating the primary side switch in a conventional flyback power converter circuit.
Figure 2A:
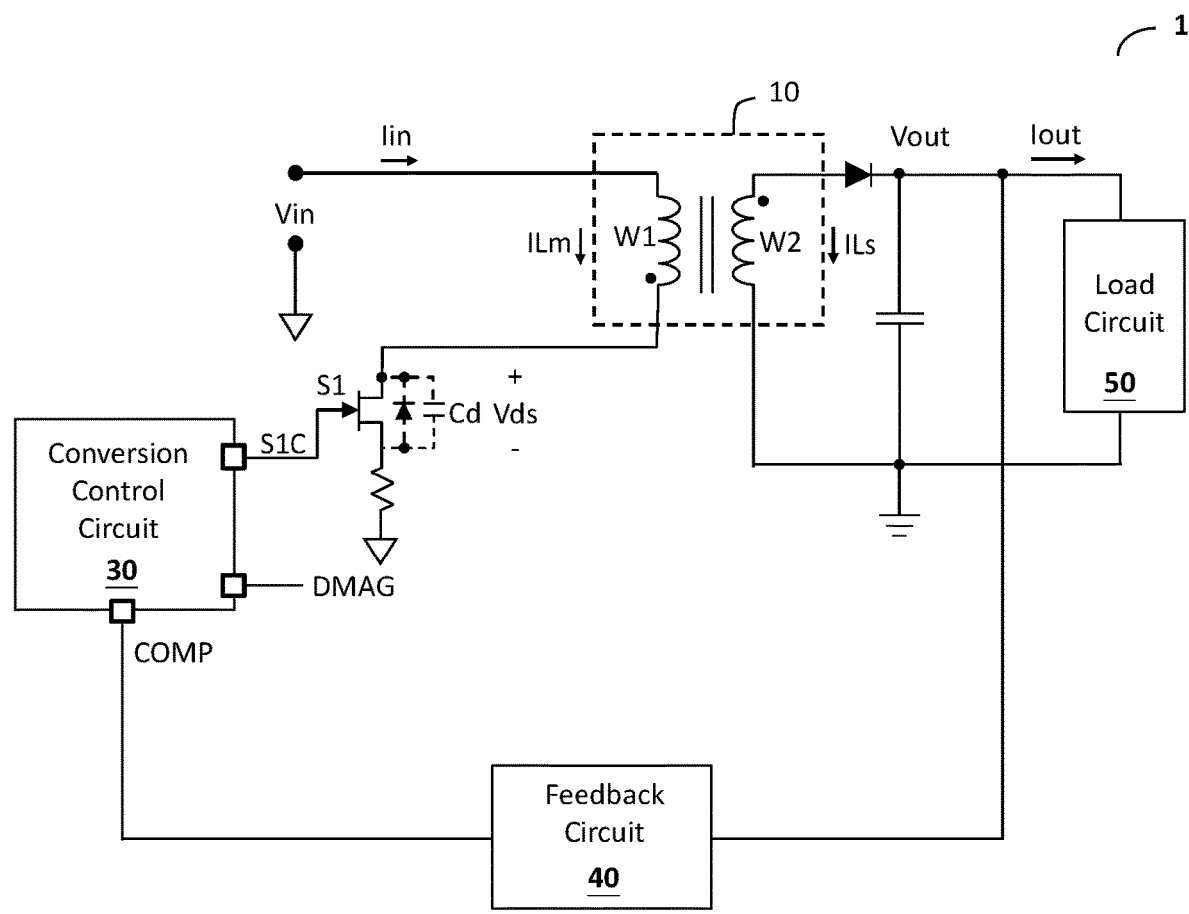
FIG. 2A shows a schematic diagram of a flyback power converter circuit according to an embodiment of the present invention.

Please refer to FIG. 2A, which shows a schematic diagram of a flyback power converter circuit (i.e., flyback power converter circuit 1) according to an embodiment of the present invention. The flyback power converter circuit 1 is configured to operably convert an input power to an output power, and supply the output power to a load circuit 50. The input power includes an input voltage Vin and an input current Iin, whereas, the output power includes an output voltage Vout and an output current Iout. The flyback power converter circuit 1 comprises: a power transformer 10, a primary side switch S1, a conversion control circuit 30 and a feedback circuit 40.

As shown in FIG. 2A, the power transformer 10 is coupled between the input voltage Vin and the output voltage Vout and operates by electromagnetic induction. The power transformer 10 includes: a primary side winding W1 and a secondary side winding W2. The primary side winding W1 is coupled to the input voltage Vin, whereas, the secondary side winding W2 is coupled to the output voltage Vout. The primary side switch S1 is coupled to the primary side winding W1. The primary side switch S1 is configured to operably control the primary side winding W1, so as to convert the input voltage Vin to the output voltage Vout at the secondary side winding W2, and supply output voltage Vout to the load circuit 50. The conversion control circuit 30 is configured to operably generate a switching signal S1C for controlling the primary side switch S1 according to a feedback compensation signal COMP, to operate the primary side winding W1 thereby.

Figure 2B:
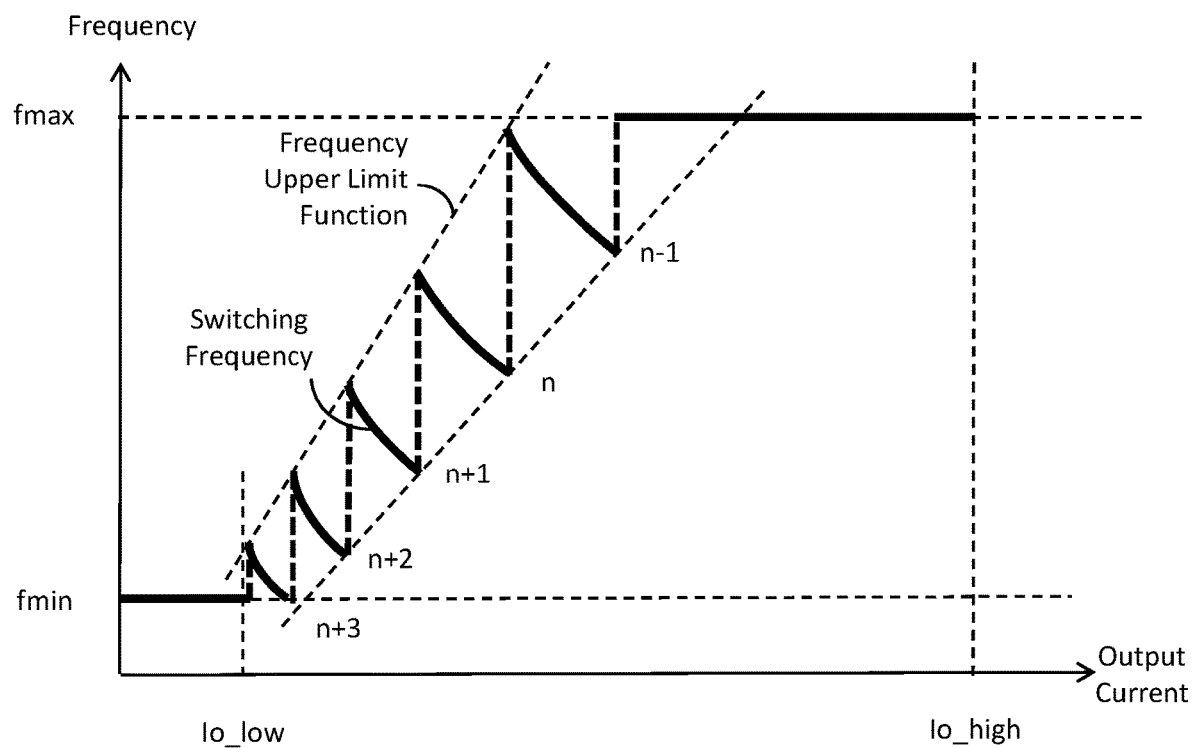
Figure 2C:
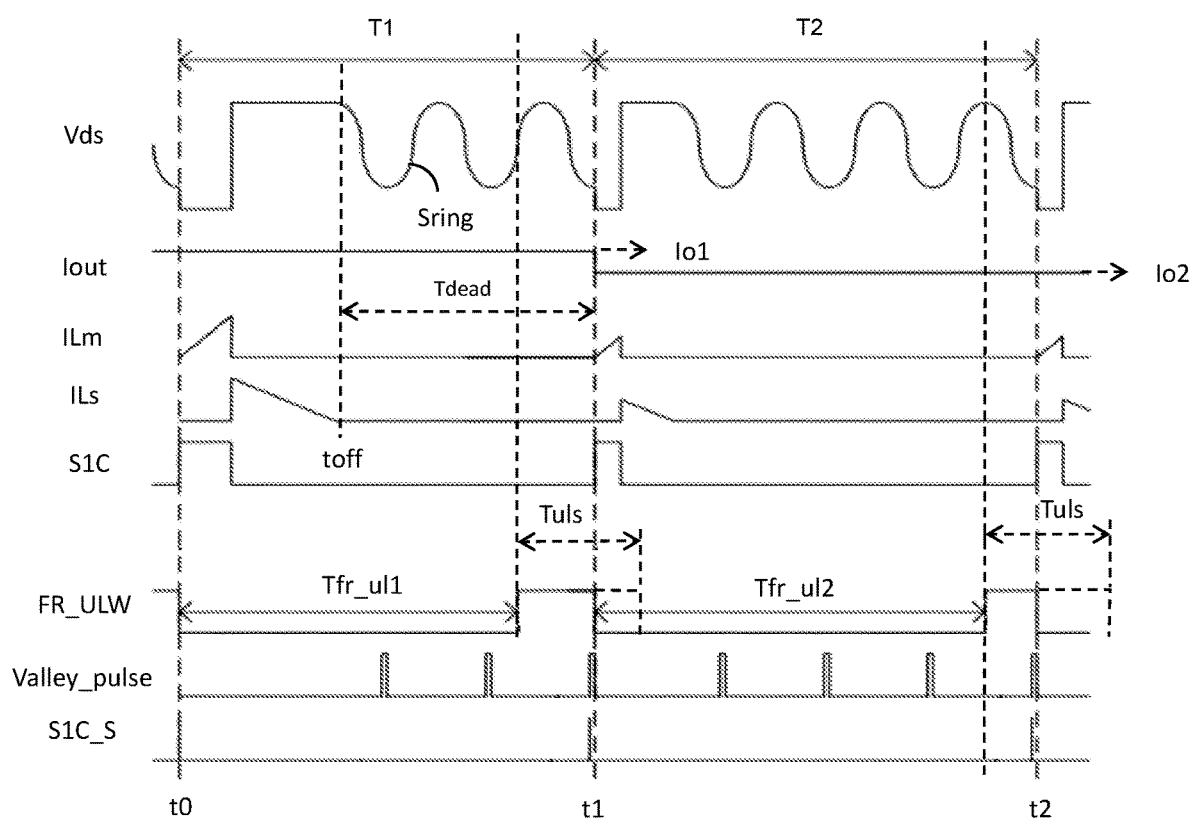
FIG. 2C shows signal waveforms of relevant signals of the embodiment shown in FIG. 2A.

Please refer to FIG. 2A in conjugation with FIG. 2B and FIG. 2C. FIG. 2B shows a characteristic curve of relevant signals of the embodiment shown in FIG. 2A, whereas, FIG. 2C shows signal waveforms of relevant signals of the embodiment shown in FIG. 2A. As shown in FIG. 2B and FIG. 2C, taking the flyback power converter circuit 1 shown in FIG. 2A as an example, when the flyback power converter circuit 1 operates in discontinuous conduction mode (DCM), in the dead time Tdead, the conversion control circuit 30 calculates an upper limit frequency corresponding to the output current Iout according to a frequency upper limit function (i.e. mathematical formula) and the conversion control circuit 30 obtains a frequency upper limit masking period (e.g. Tfr_ul1 or Tfr_ul2) according to a reciprocal of the upper limit frequency, wherein the frequency upper limit masking period is a period starting from a time point at which the primary side switch S1 begins to be turned ON. In additional, during an upper limit selection period Tuls, the conversion control circuit 30 selects a valley among the valleys of a ringing signal Sring of the voltage Vds across the primary side switch S1, as an upper limit locked valley, and the conversion control circuit 30 once again turns ON the primary side switch S1 at a time point of the upper limit locked valley, wherein the upper limit selection period is a period starting from a time point at which the frequency upper limit masking period ends.

The frequency upper limit masking period is inversely correlated to a level of the output current Iout. A switching period is defined as a period between the turned-ON time points of the primary side switch S1 at two immediately consecutive cycles. The reciprocal of the switching period is the switching frequency. Under the same level of the output current Iout, the switching frequency is not higher than the upper limit frequency in the DCM. The upper limit frequency can be for example a frequency corresponding to the frequency upper limit function shown in FIG. 2B.

Figure 3:
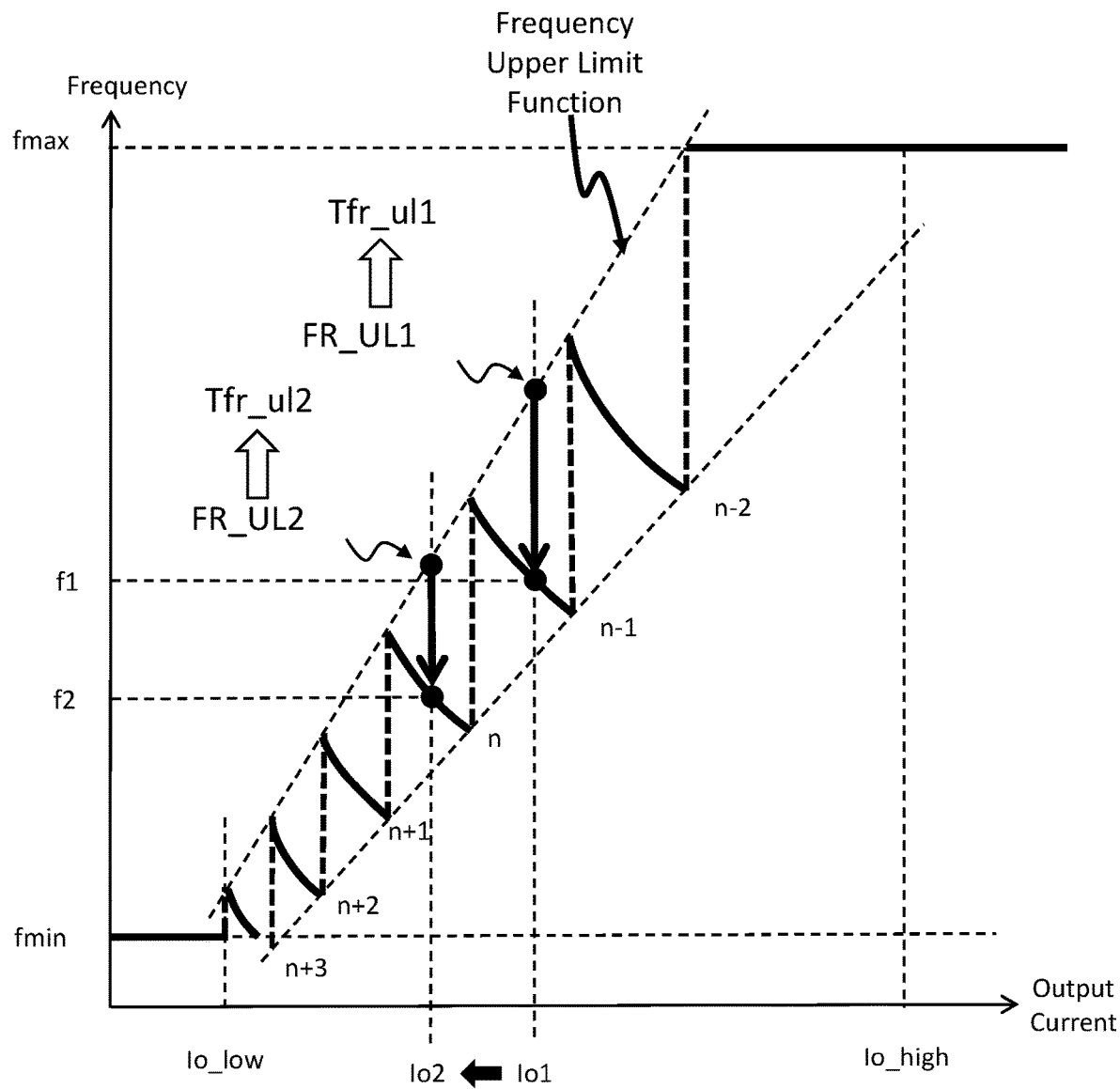
FIG. 3 shows a characteristic curve of switching frequency versus output current in a flyback power converter circuit of the present invention as shown in FIG. 2B.

To elaborate in more detail, please refer to FIG. 3, which shows a characteristic curve of switching frequency versus output current in a flyback power converter circuit of the present invention as shown in FIG. 2B. FIG. 3 is an example demonstrating that when the output current Iout decreases from the level Io1 to the level Io2 as the load condition of the load circuit 50 drops, how the present invention can determine an occurrence time point of the upper limit locked valley.

Please refer to FIG. 3 along with FIG. 2C. Based on the level Io1 of the output current Iout, a signal related to the level Io1 of the output current Iout (which can be, for example but not limited to, the feedback compensation signal COMP) is introduced to the frequency upper limit function, and a corresponding upper limit frequency FR_UL1 can be obtained. The conversion control circuit 30 obtains a frequency upper limit masking period Tfr_ul1 according to a reciprocal of the upper limit frequency FR_UL1, wherein the frequency upper limit masking period Tfr_ul1 is a period starting from a time point (i.e., time point t0) at which the primary side switch S1 begins to be turned ON. And, during an upper limit selection period Tuls following the frequency upper limit masking period Tfr_ul1, the conversion control circuit 30 selects the first detected valley in a ringing signal Sring of the voltage Vds across the primary side switch S1 as an upper limit locked valley, and the conversion control circuit 30 once again turns ON the primary side switch S1 at a time point t1 when the upper limit locked valley occurs, wherein the upper limit selection period Tuls is a period starting from a time point at which the frequency upper limit masking period Tfr_ul1 ends. It is noteworthy that, in this embodiment, when the output current Iout has a level of Io1, the corresponding switching frequency is the frequency f1, and when the output current Iout has a level of Io2, the corresponding switching frequency is the frequency f2, as shown in FIG. 3. In other words, during the frequency upper limit masking period Tfr_ul1, the primary side switch S1 will not be turned ON.

Please refer to FIG. 3 in conjugation with FIG. 2C. When the output current Iout drops from the level Io1 to the level Io2, a related signal (which can be, for example but not limited to, the feedback compensation signal COMP) of the level Io2 of the output current Iout is introduced to the frequency upper limit function to obtain a corresponding upper limit frequency FR_UL2. The conversion control circuit 30 obtains a frequency upper limit masking period Tfr_ul2 according to a reciprocal of the upper limit frequency FR_UL2, wherein the frequency upper limit masking period Tfr_ul2 is a period starting from a time point (i.e., time point t1) at which the primary side switch S1 begins to be turned ON. And, during an upper limit selection period Tuls following the frequency upper limit masking period Tfr_ul2, the conversion control circuit 30 selects a first detected valley in a ringing signal Sring of the voltage Vds across the primary side switch S1 as an upper limit locked valley, so that the conversion control circuit 30 once again turns ON the primary side switch S1 at a time point t2 when the upper limit locked valley occurs, wherein the upper limit selection period Tuls is a period starting from a time point at which the frequency upper limit masking period Tfr_ul2 ends. Because the level Io2 is lower than the level Io1, the frequency upper limit masking period Tfr_ul2 is longer than the frequency upper limit masking period Tfr_ul1 (note that the frequency upper limit masking period is inversely correlated to the level of the output current).

Please still refer to FIG. 3 in conjugation with FIG. 2C. As described above, a switching period is defined as a period between the turned-ON time points of the primary side switch S1 at two immediately consecutive cycles. That is, a switching period T1 is defined as a period ranging from the timing point t0 to the timing point t1, and a switching period T2 is defined as a period ranging from the timing point t1 to the timing point t2, as shown in FIG. 2C. That an upper limit locked valley is selected in an upper limit selection period Tuls following a frequency upper limit masking period (e.g., frequency upper limit masking period Tfr_ul1 or frequency upper limit masking period Tfr_ul2), means that the selected upper limit locked valley occurs at a time point later than the frequency upper limit masking period, which further means that the switching frequency will not be not higher than the upper limit frequency in the DCM.

It is noteworthy that, in this embodiment, a thick black solid curve as shown in FIG. 2B indicates a relationship between the switching frequency and the output current Iout under an implementation wherein the primary side switch S1 is turned ON at an occurrence time point of an upper limit locked valley. Different thick black solid curves represent different valleys in the ringing signal Sring. As shown in FIG. 2B, different thick black solid curves represent different valleys (e.g., the (n−1)th valley, the nth valley, the (n+1)th valley, the (n+2)th valley and the (n+3)th valley) in the ringing signal Sring. Note that the "nth" valley is the serial number counted from the start of the ringing signal Sring, or from the start of the dead time Tdead, but not from the start of the upper limit selection period Tuls.

Note that, although it is intended to obtain an occurrence time point of an upper limit locked valley which exactly matches a valley of a ringing signal Sring, however due to non-idealities caused by for example imperfection of components or imperfect matching among components, the occurrence time point of the upper limit locked valley may not be exactly obtained at the valley of the ringing signal Sring, but just close to the valley of the ringing signal Sring.

In other words, according to the present invention, a certain level of error between the obtained time point of the upper limit locked valley and the exact occurrence time point of the valley of the ringing signal Sring is acceptable.

In one embodiment, the upper limit selection period Tuls is a predetermined value which can be determined by a user taking into consideration the period of the ringing signal Sring and a time out requirement. In other embodiments, the upper limit selection period Tuls can be adaptively adjusted according to circuit design.

FIG. 2C also shows waveforms of a primary side current ILm flowing through the primary side switch S1 and a secondary side current ILs. As shown in FIG. 2C, during a dead time Tdead which is between a time point toff at which the secondary side current ILs drops to zero and a time point (e.g., t1) at which the primary side switch S1 is once again turned ON, the voltage Vds across the primary side switch shows a ringing signal Sring.

In one embodiment, the feedback circuit 40 is configured to operably generate the feedback compensation signal COMP according to the output current Iout. The conversion control circuit 30 is configured to operably determine the frequency upper limit masking period Tfr_ul1 according to the feedback compensation signal COMP. For example, in one embodiment, the flyback power converter circuit 1 of the present invention can be designed to operate in a peak current control mode; under such situation, the feedback compensation signal COMP corresponds to the output current Iout.

It is noteworthy that, in the present invention, the frequency reduction current upper limit Io_high and the frequency reduction lower current limit Io_low do not serve to limit the maximum level and minimum level of the output current Iout. The frequency reduction current upper limit Io_high and the frequency reduction lower current limit Io_low are provided to define a range of the output current Iout in which the approach provided by the present invention is triggered to reduce the switching loss of the power switch.

Figure 4:
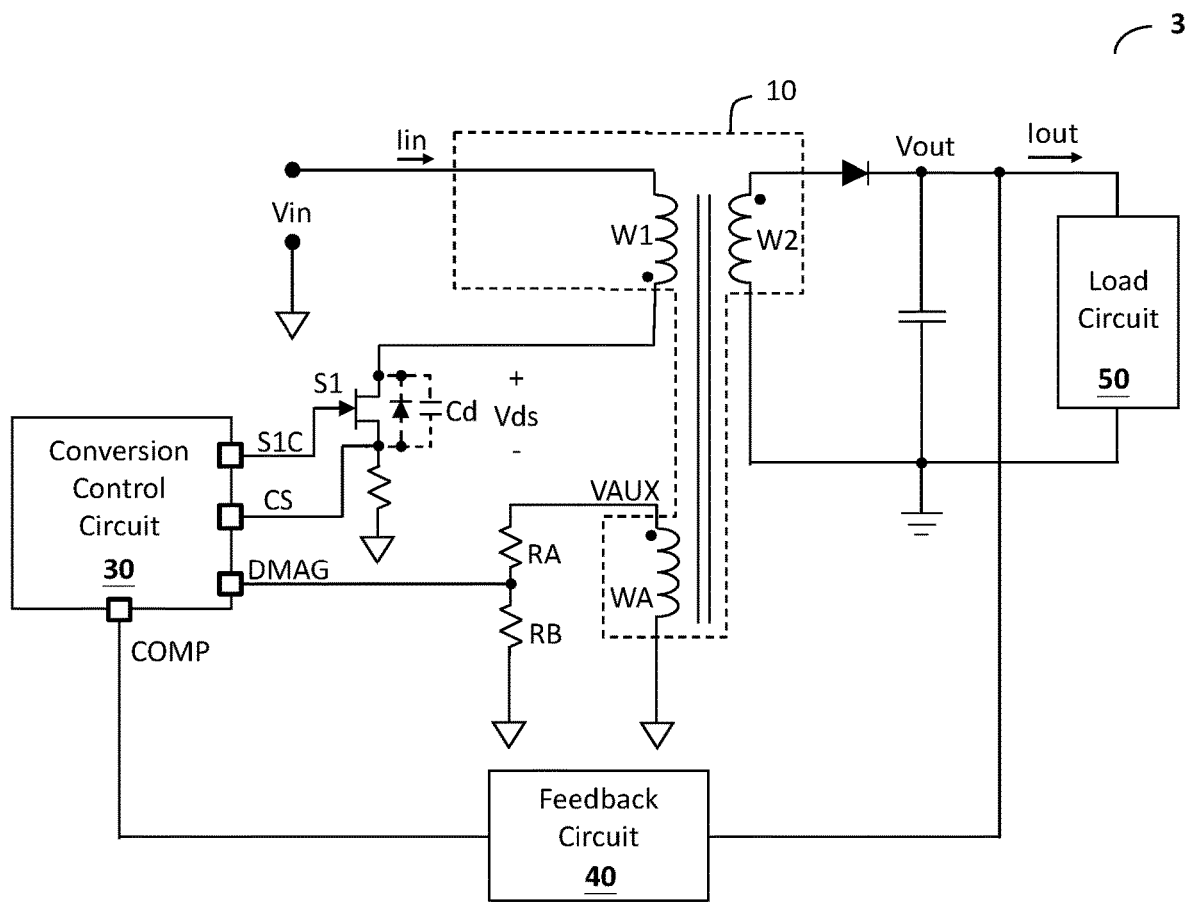
FIG. 4 shows a schematic diagram of a flyback power converter circuit according to an embodiment of the present invention.

Please refer to FIG. 4, which shows a schematic diagram of a flyback power converter circuit (i.e., flyback power converter circuit 3) according to an embodiment of the present invention. The flyback power converter circuit 3 shown in FIG. 4 is different from the flyback power converter circuit 1 shown in FIG. 2A in that the flyback power converter circuit 3 in this embodiment further comprises: an auxiliary winding WA, which is configured to operably sense the voltage Vds across the primary side switch S1, so as to generate an auxiliary signal VAUX. The auxiliary signal VAUX is divided by a voltage divider consisting of resistors RA and resistor RB, and the generated divided voltage of the auxiliary signal VAUX supplies a magnetic induction signal DMAG related to a ringing signal Sring to the conversion control circuit 30. Besides, in this embodiment, the conversion control circuit 30 is configured to operably generate a switching signal S1C further according to a current sensing signal CS generated according to a primary side switch current flowing through the primary side switch S1.

In one preferred embodiment, as shown in FIG. 2C, during the upper limit selection period Tuls, the conversion control circuit 30 selects a first valley or a valley of a predetermined serial number among the valleys in the ringing signal Sring as the upper limit locked valley, wherein the upper limit selection period Tuls is a period starting from a time point at which the frequency upper limit masking period (e.g., frequency upper limit masking period Tfr_ul1 or frequency upper limit masking period Tfr_ul2) ends.

Figure 5:
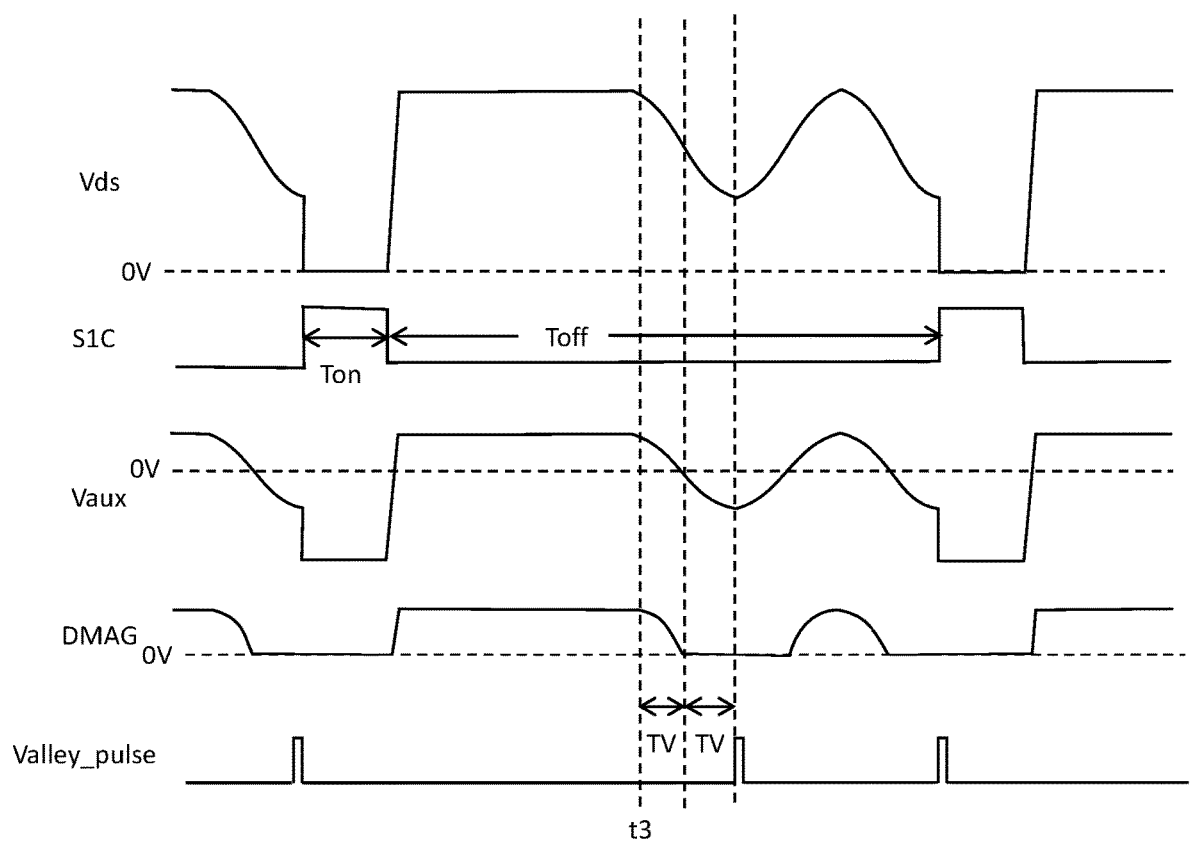
FIG. 5 shows signal waveforms of relevant signals related to a ringing signal of the present invention.

Please refer to FIG. 5, which shows signal waveforms of relevant signals related to a ringing signal of the present invention. Please refer to FIG. 5 along with FIG. 4. FIG. 5 demonstrates how the auxiliary winding WA provides an auxiliary signal VAUX related to the ringing signal Sring. As shown in FIG. 5, when the switching signal S1C is switched to high level (i.e., during ON period Ton), the magnetic induction signal DMAG is clamped to 0V. On the other hand, when the switching signal S1C is switched to low level (i.e., during OFF period Toff) and when the inductor current become zero (i.e., the current flowing through a primary side winding W1 and the current flowing through a secondary side winding W2 are both zero), the primary side winding W1 and a parasitic capacitor Cd of the primary side switch S1 start resonant interaction. The starting time point (i.e., the time point t3) of such resonance is referred to as a "knee point". A period TV is defined as a period from the knee point to when the level of the magnetic induction signal DMAG drops to 0V. Starting from a time point at which the level of the magnetic induction signal DMAG drops to 0V, another period TV is counted, and the end time point of such another period TV is defined as an occurrence time point of a valley of the ringing signal Sring. A pulse of a valley detection signal Valley_pulse is accordingly generated.

Figure 6:
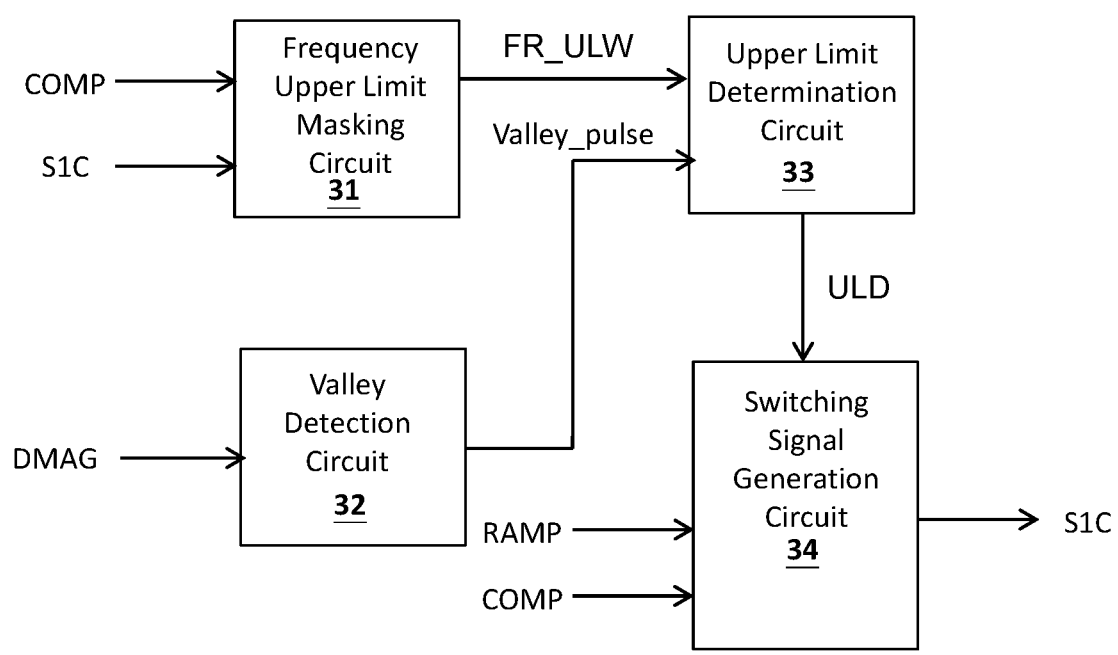
FIG. 6 shows a schematic diagram of a conversion control circuit according to an embodiment of the present invention.

Please refer to FIG. 6, which shows a schematic diagram of a conversion control circuit (i.e., conversion control circuit 30) according to an embodiment of the present invention. As shown in FIG. 6, the conversion control circuit 30 includes: a frequency upper limit masking circuit 31, a valley detection circuit 32, an upper limit determination circuit 33 and a switching signal generation circuit 34. The frequency upper limit masking circuit 31 is configured to operably obtain a turned-ON time point of the primary side switch S1 according to the switching signal S1C, and generate an ON time point signal S1C_S. Besides, the frequency upper limit masking circuit 31 is configured to operably calculate the frequency upper limit masking period Tfr_ul according to the feedback compensation signal COMP related to the output current Iout, and generate a frequency upper limit masking signal FR_ULW. The valley detection circuit 32 is configured to operably generate a valley detection signal Valley_pulse according to the ringing signal Sring, wherein the valley detection signal Valley_pulse is indicative of an occurrence time point of at least one valley in the ringing signal Sring during the dead time Tdead.

Please still refer to FIG. 6. During the upper limit selection period Tuls after the frequency upper limit masking period Tfr_ul, the upper limit determination circuit 33 selects the valley of the predetermined serial number as the occurrence time point of the upper limit locked valley according to the frequency upper limit masking signal FR_ULW and the valley detection signal Valley_pulse, so as to generate an upper limit determination signal ULD. The switching signal generation circuit 34 is configured to operably compare the feedback compensation signal COMP with a ramp signal RAMP, so as to generate a reset signal RST, and to operably generate the switching signal S1C according to the reset signal RST and the upper limit determination signal ULD.

Figure 7:
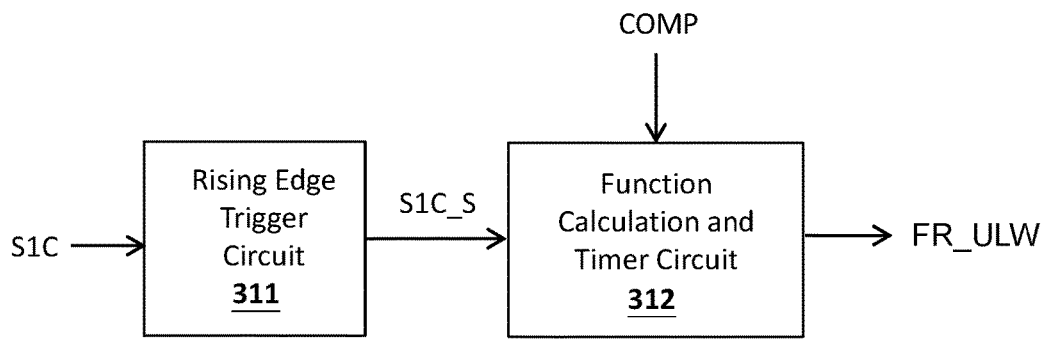
FIG. 7 shows an embodiment of a frequency upper limit masking circuit 31.

Please refer to FIG. 7, which shows an embodiment of a frequency upper limit masking circuit (i.e., frequency upper limit masking circuit 31). As shown in FIG. 7, the frequency upper limit masking circuit 31 includes: a rising edge trigger circuit 311 and a function calculation and timer circuit 312. The rising edge trigger circuit 311 is configured to operably trigger generating the ON time point signal S1C_S according to a rising edge of the switching signal S1C when the switching signal S1C is switched to high level. The function calculation and timer circuit 312 is reset according to the ON time point signal S1C_S; after the rest, the function calculation and timer circuit 312 introduces a related signal (which can be, for example but not limited to, the feedback compensation signal COMP) of the output current Iout into the frequency upper limit function, so as to derive and obtain a corresponding upper limit frequency FR_UL; and the function calculation and timer circuit 312 obtains a reciprocal of the upper limit frequency FR_UL, thus obtaining the frequency upper limit masking period Tfr_ul. Besides, the function calculation and timer circuit 312 counts an upper limit selection period Tuls for example by a timer after the frequency upper limit masking period Tfr_ul ends. The function calculation and timer circuit 312 generates the frequency upper limit masking signal FR_ULW which is indicative of the frequency upper limit masking period Tfr_ul and the upper limit selection period Tuls after the turned-ON time point of the primary side switch S1.

Figure 8:
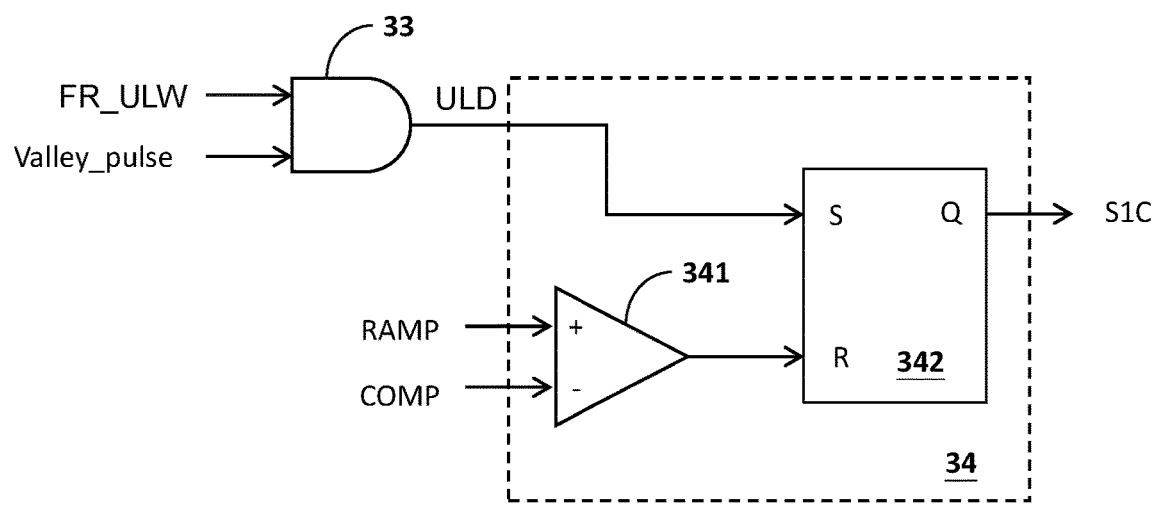
FIG. 8 shows an embodiment of an upper limit determination circuit and an embodiment of a switching signal generation circuit.

Please refer to FIG. 8, which shows an embodiment of an upper limit determination circuit (i.e., upper limit determination circuit 33) and an embodiment of a switching signal generation circuit (i.e., switching signal generation circuit 34). As shown in FIG. 8, the upper limit determination circuit 33 can include, for example but not limited to, an AND logic gate which receives the frequency upper limit masking signal FR_ULW and the valley detection signal Valley_pulse. Please refer to FIG. 8 along with FIG. 2C. As an example, during the upper limit selection period Tuls after the frequency upper limit masking period Tfr_ul1 of the frequency upper limit masking signal FR_ULW, the valley detection signal Valley_pulse has a pulse at the time point t1. Thus, the operation conducted by the AND logic gate of the upper limit determination circuit 33 causes a pulse to be generated in the upper limit determination signal ULD at the time point t1, to indicate an occurrence time point of the first valley in the ringing signal Sring during the upper limit selection period Tuls, and this is the occurrence time point of the upper limit locked valley.

Please still refer to FIG. 8. As shown in FIG. 8, the switching signal generation circuit 34 for example includes: a comparison circuit 341 and a logic circuit 342. The comparison circuit 341 is configured to operably compare the feedback compensation signal COMP with the ramp signal RAMP, so as to generate a comparison signal. The ramp signal RAMP is correlated to a primary side current ILm flowing through the primary side winding W1. The primary side current ILm for example can be obtained according to a current sensing signal CS shown in FIG. 4; the details thereof are not redundantly explained here because primary side current sense technique is well known to those skilled in the art. The logic circuit 342 can be, for example but not limited to, a filp-flop circuit shown in FIG. 8. A setting terminal S of the filp-flop circuit receives the upper limit determination signal ULD; a resetting terminal R of the filp-flop circuit receives the above-mentioned comparison signal; an output terminal Q of the filp-flop circuit generates the switching signal S1C. It should be understood that the implementation of the logic circuit 342 as a filp-flop circuit in the above-mentioned preferred embodiment is only an illustrative example, but not for limiting the scope of the present invention. In other embodiments, it is also practicable and within the scope of the present invention that the logic circuit 342 can be any other circuit as long as a switching signal S1C can be generated according to the comparison signal and the upper limit determination signal ULD, for controlling the power switch S1.

Figure 9A:
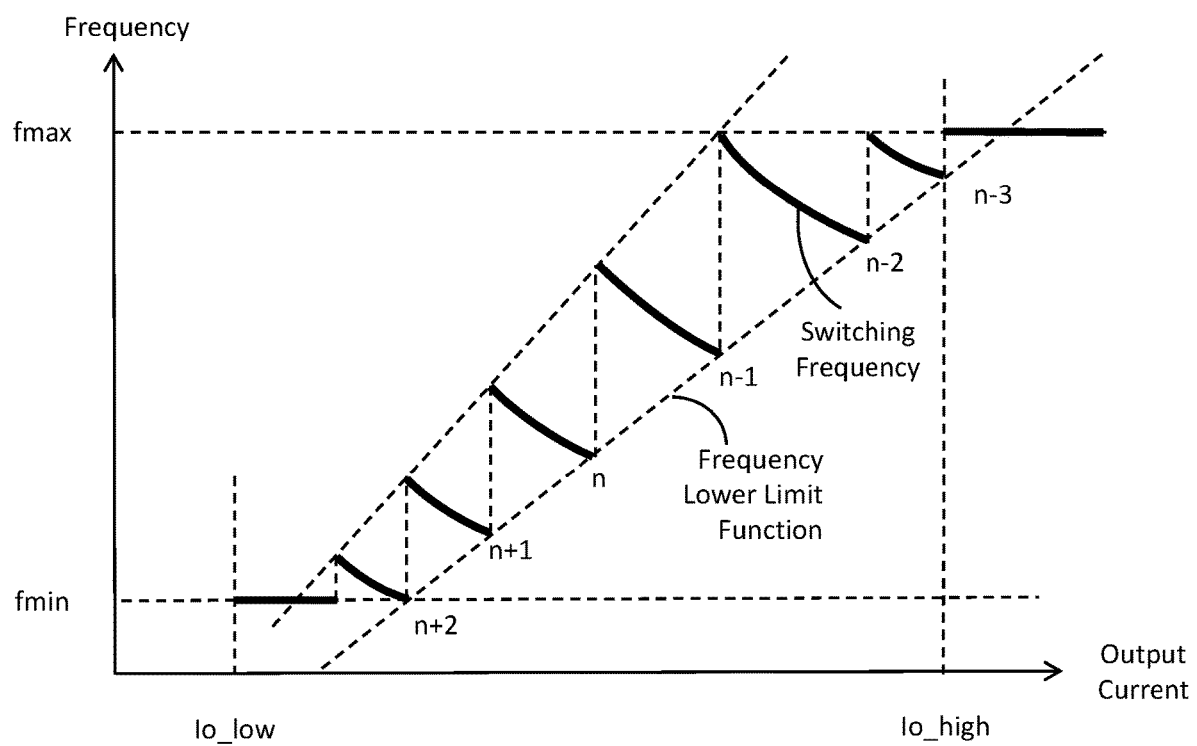
Figure 9B:
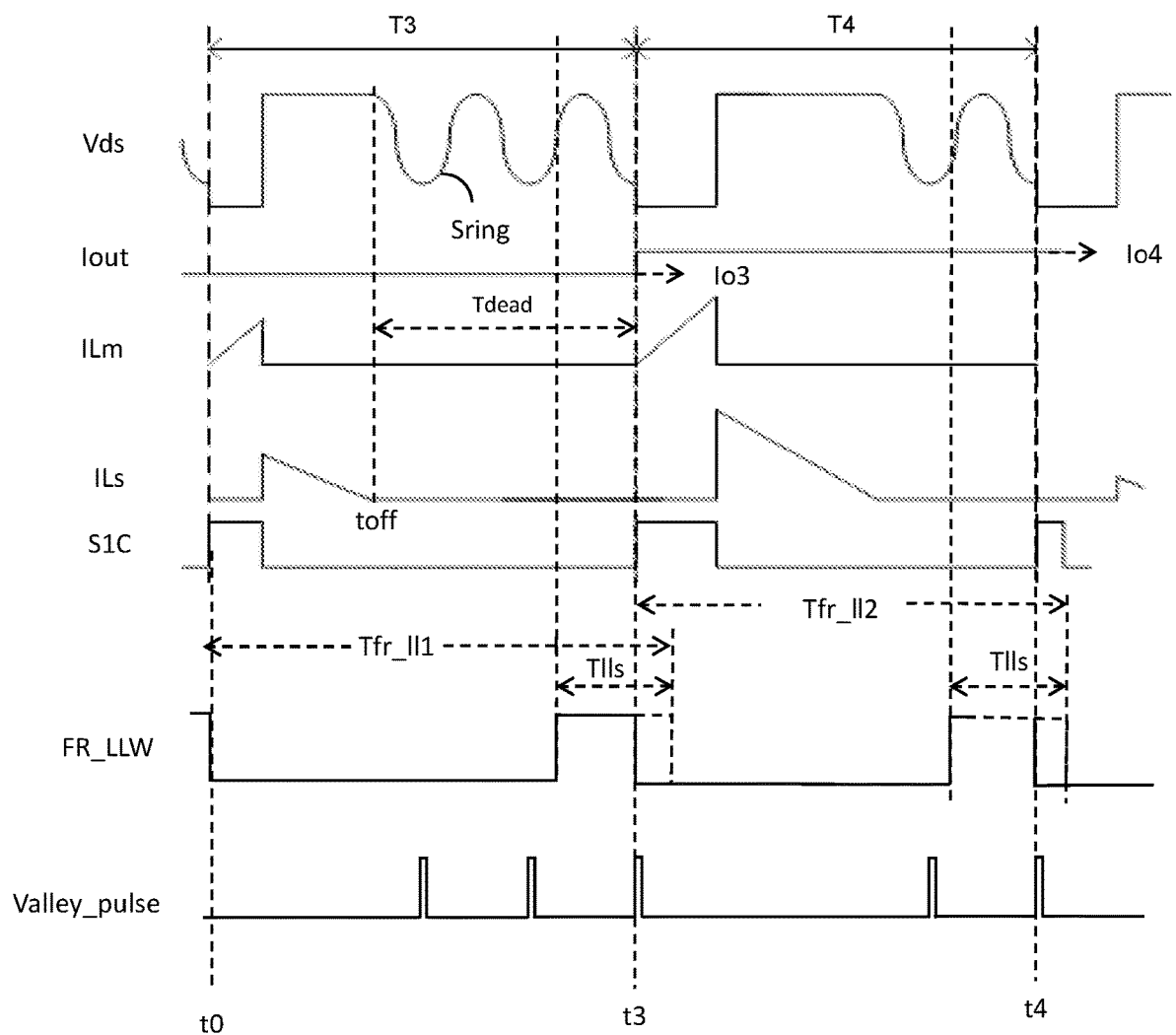
FIG. 9B shows signal waveforms of relevant signals of the embodiment shown in FIG. 9A wherein said another operation mechanism is conducted.

Please refer to FIG. 2A along with FIG. 9A and FIG. 9B. FIG. 9A shows a characteristic curve of relevant signals of the embodiment shown in FIG. 2A wherein another operation mechanism is conducted, whereas, FIG. 2C shows signal waveforms of relevant signals of the embodiment shown in FIG. 2A wherein said another operation mechanism is conducted. In FIG. 9A and FIG. 9B, taking the flyback power converter circuit 1 shown in FIG. 2A as an example, when the flyback power converter circuit 1 operates in discontinuous conduction mode (DCM), in the dead time Tdead, during a dead time, the conversion control circuit 30 calculates a lower limit frequency corresponding to the output current Iout according to a frequency lower limit function, and obtains a frequency lower limit masking period according to a reciprocal of the lower limit frequency, wherein the frequency lower limit masking period is a period starting from a time point at which the primary side switch S1 begins to be turned ON. During a lower limit selection period, the conversion control circuit 30 selects a specific valley among the valleys in the ringing signal Sring of the voltage Vds across the primary side switch S1 as a lower limit locked valley, whereby the conversion control circuit 30 once again turns ON the primary side switch S1 at an occurrence time point of the lower limit locked valley, wherein the lower limit selection period is a period prior to a time point at which the frequency lower limit masking period ends.

The frequency lower limit masking period is inversely correlated to a level of the output current Iout. A switching period is defined as a period between the turned-ON time points of the primary side switch S1 at two immediately consecutive cycles. A reciprocal of the switching period is defined as a switching frequency. Under the same level of the output current Iout, the switching frequency is not lower than the lower limit frequency in the DCM. The lower limit frequency can be for example a frequency corresponding to the frequency lower limit function shown in FIG. 9A.

Figure 10:
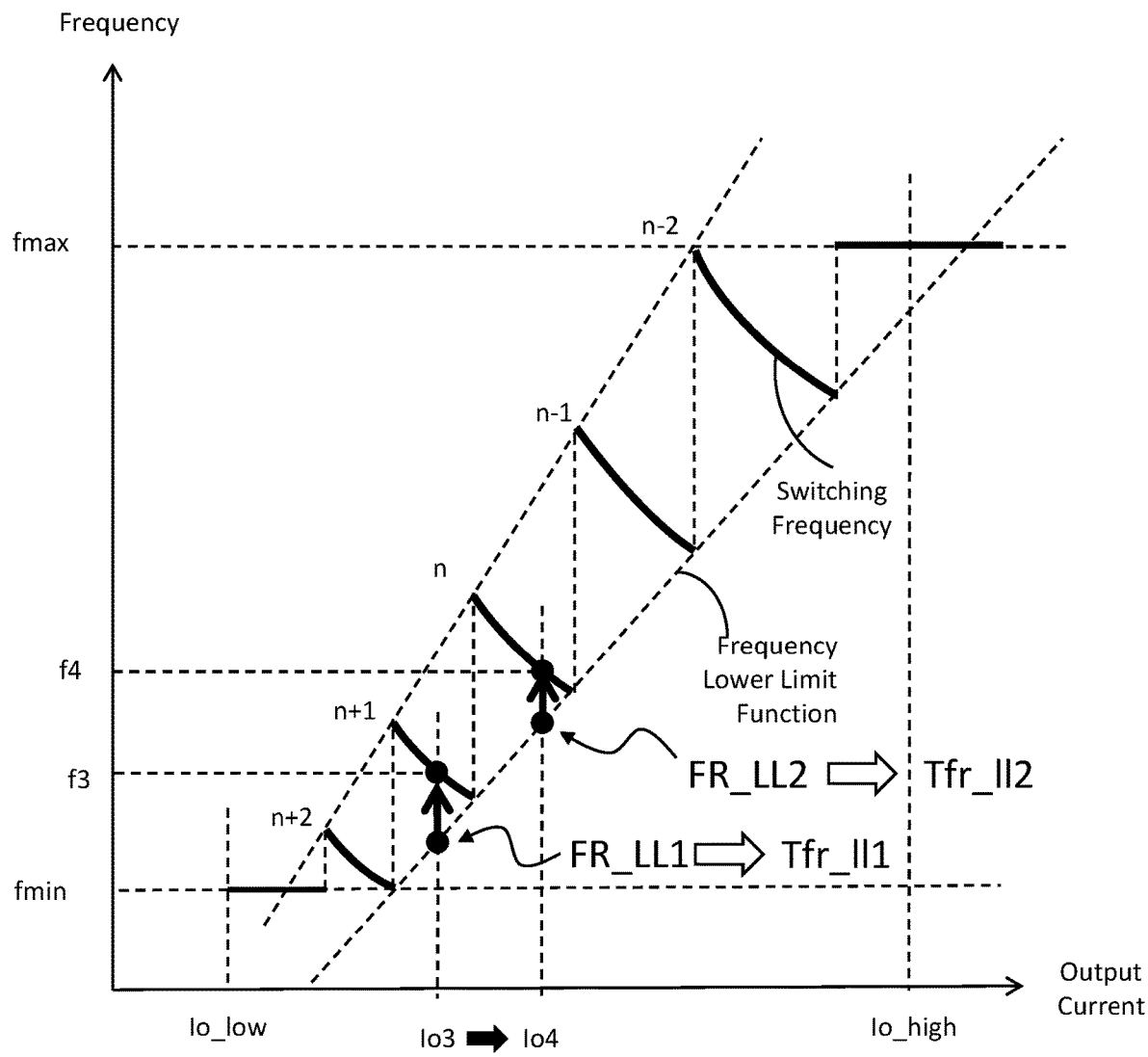
FIG. 10 shows a characteristic curve of switching frequency versus output current in a flyback power converter circuit of the present invention as shown in FIG. 9A.

To elaborate in more detail, please refer to FIG. 10, which shows a characteristic curve of switching frequency versus output current in a flyback power converter circuit of the present invention as shown in FIG. 9A. FIG. 10 is an example demonstrating that when the output current Iout increases from the level Io3 to the level Io4 as the load condition of the load circuit 50 increases, how the present invention can determine an occurrence time point of the lower limit locked valley.

Please refer to FIG. 10 in conjugation with FIG. 9B. When a related signal (which can be, for example but not limited to, the feedback compensation signal COMP) of the level Io3 of the output current Iout is introduced to the frequency lower limit function, a corresponding lower limit frequency FR_LL1 can be obtained. A frequency lower limit masking period Tfr_ll1 can be obtained according to a reciprocal of the lower limit frequency FR_LL1, wherein the frequency lower limit masking period Tfr_ll1 is a period starting from a time point (i.e., time point t0) at which the primary side switch S1 begins to be turned ON. And, during a lower limit selection period Tlls, the conversion control circuit 30 selects a first valley (i.e., a valley that is closest to the starting time point of the frequency lower limit masking period Tfr_ll1) in the ringing signal Sring of the voltage Vds across the primary side switch S1 as a lower limit locked valley, whereby the conversion control circuit 30 once again turns ON the primary side switch S1 at an occurrence time point t3 of the lower limit locked valley, wherein the lower limit selection period Tlls is a period prior to a time point at which the frequency lower limit masking period Tfr_ll1 ends.

Please refer to FIG. 10 along with FIG. 9B. When the output current Iout increases from the level Io3 to the level Io4, when a related signal (which can be, for example but not limited to, the feedback compensation signal COMP) of the level Io4 of the output current Iout is introduced to the frequency lower limit function, a corresponding lower limit frequency FR_LL2 can be obtained. A frequency lower limit masking period Tfr_ll2 can be obtained according to a reciprocal of the lower limit frequency FR_LL2, wherein the frequency lower limit masking period Tfr_ll2 is a period starting from a time point (i.e., time point t3) at which the primary side switch S1 begins to be turned ON. And, during the lower limit selection period Tlls, the conversion control circuit 30 selects a first valley (i.e., a valley that is closest to a starting time point of the frequency lower limit masking period Tfr_ll2) in the ringing signal Sring of the voltage Vds across the primary side switch S1 as a lower limit locked valley, whereby the conversion control circuit 30 once again turns ON the primary side switch S1 at an occurrence time point t4 of the lower limit locked valley, wherein the lower limit selection period Tlls is a period prior to a time point at which the frequency lower limit masking period Tfr_ll2 ends. Because the level Io4 is higher than the level Io3, the frequency lower limit masking period Tfr_ll2 is shorter than the frequency lower limit masking period Tfr_ll1 (note that the frequency lower limit masking period is inversely correlated to a level of the output current). It is noteworthy that, in this embodiment, when the output current Iout has a level of Io3, its corresponding switching frequency is f3, and when the output current Iout has a level of Io4, its corresponding switching frequency is f4, as shown in FIG. 10.

Please still refer to FIG. 10 along with FIG. 9B. As described above, a switching period is defined as a period between the turned-ON time points of the primary side switch S1 at two immediately consecutive cycles. That is, a switching period T3 is defined as a period ranging from the timing point t0 to the timing point t3, and a switching period T4 is defined as a period ranging from the timing point t3 to the timing point t4, as shown in FIG. 9B. That a lower limit locked valley is selected in a lower limit selection period Tlls before the end of a frequency lower limit masking period (e.g., frequency lower limit masking period Tfr_ll1 or frequency lower limit masking period Tfr_ll2) means that the lower limit locked valley occurs at a time point before the end of the frequency lower limit masking period, which further means that the switching frequency will not be lower than the lower limit frequency.

The thick black solid curve in FIG. 9A indicates a relationship between the switching frequency and the output current Iout under an implementation wherein the primary side switch S1 is turned ON at an occurrence time point of a lower limit locked valley. Different thick black solid curves represent different valleys in the ringing signal Sring. As shown in FIG. 9A, different thick black solid curves represent different valleys (e.g., the (n−2)th valley, the (n−1)th valley, the nth valley, the (n+1)th valley and the (n+2)th valley) in the ringing signal Sring. Note that the "nth" valley is the serial number counted from the start of the dead time Tdead, but not a serial number of a valley during the lower limit selection period Tlls.

It is noteworthy that, in one embodiment, the lower limit selection period Tlls is a predetermined value which can be determined by a user taking into consideration the period of the ringing signal Sring. In other embodiment, the lower limit selection period Tlls can be adaptively adjusted according to circuit design.

It is noteworthy that, in this embodiment, FIG. 9B also shows waveforms of a primary side current ILm (which flows through the primary side switch S1) and a secondary side current ILs. As shown in FIG. 9B, during the dead time Tdead between a time point toff at which the secondary side current ILs drops to zero and a time point (e.g., t3) at which the primary side switch S1 is turned ON in the next cycle, the voltage Vds across the primary side switch has a ringing waveform (i.e. the ringing signal Sring).

Figure 11:
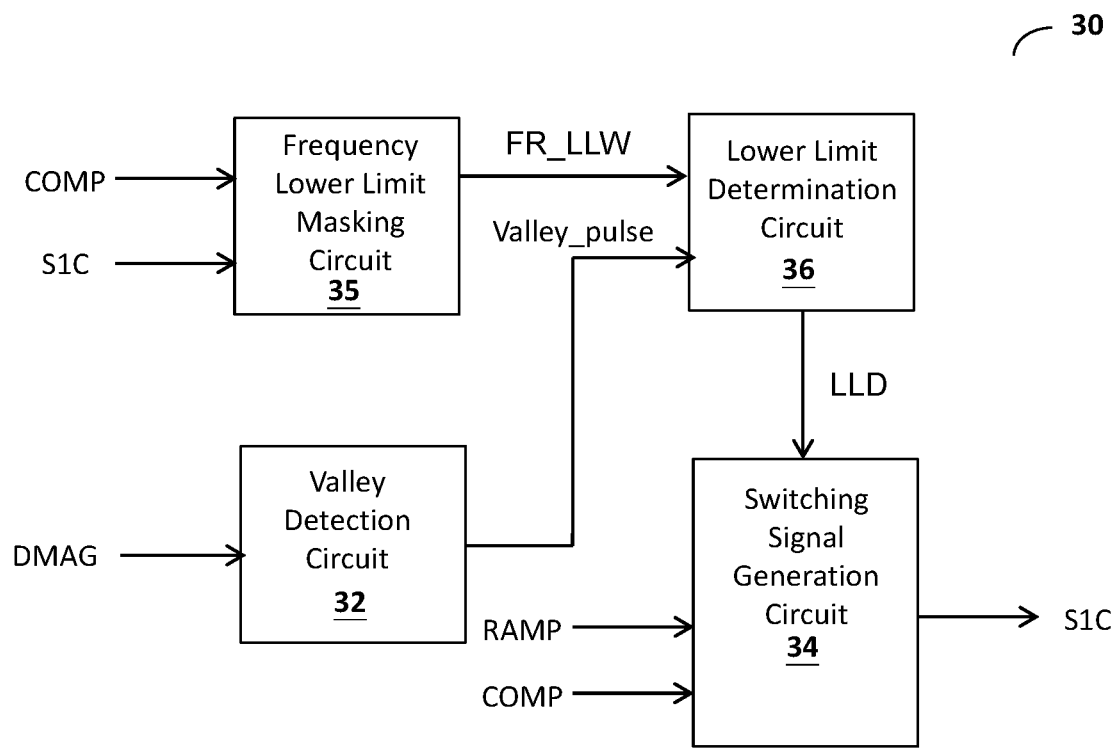
FIG. 11 shows a schematic diagram of a conversion control circuit according to another embodiment of the present invention.

Please refer to FIG. 11, which shows a schematic diagram of a conversion control circuit 30 according to another embodiment of the present invention. As shown in FIG. 11, the conversion control circuit 30 includes: a frequency lower limit masking circuit 35, a valley detection circuit 32, a lower limit determination circuit 36 and a switching signal generation circuit 34. The frequency lower limit masking circuit 35 is configured to operably obtain a turned-ON time point of the primary side switch S1 according to the switching signal S1C, and generate an ON time point signal S1C_S accordingly. Besides, the frequency lower limit masking circuit 35 is configured to operably calculate the frequency lower limit masking period Tfr_l1 according to the feedback compensation signal COMP related to the output current Iout, and generate a frequency lower limit masking signal FR_LLW accordingly. The valley detection circuit 32 is configured to operably generate a valley detection signal Valley_pulse according to the ringing signal Sring, wherein the valley detection signal Valley_pulse is indicative of an occurrence time point of at least one valley in the ringing signal Sring during the dead time Tdead.

Please still refer to FIG. 11. During the lower limit selection period Tlls, the lower limit determination circuit 36 selects the valley of the predetermined serial number as the occurrence time point of the lower limit locked valley according to the frequency lower limit masking signal FR_LLW and the valley detection signal Valley_pulse, and generates a lower limit determination signal LLD. The switching signal generation circuit 34 compares the feedback compensation signal COMP with a ramp signal RAMP to generate a reset signal RST, and the switching signal generation circuit 34 generates the switching signal S1C according to the reset signal RST and the lower limit determination signal LLD.

Figure 12:
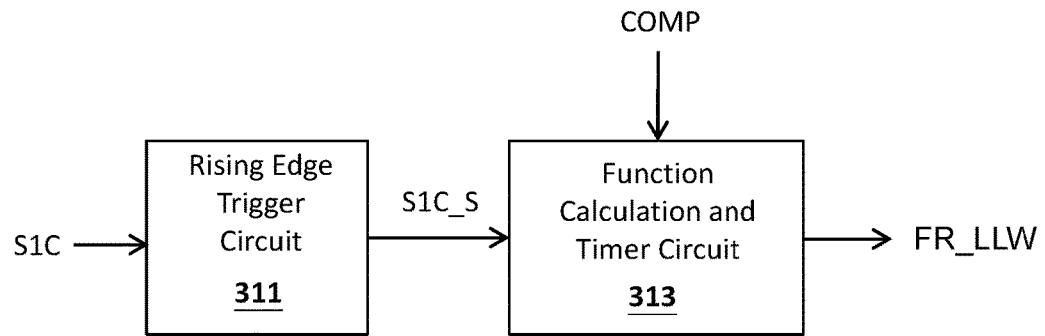
FIG. 12 shows an embodiment of a frequency lower limit masking circuit 35.

Please refer to FIG. 12, which shows an embodiment of a frequency lower limit masking circuit (i.e., frequency lower limit masking circuit 35). As shown in FIG. 12, the frequency lower limit masking circuit 35 includes: a rising edge trigger circuit 311 and a function calculation and timer circuit 313. The rising edge trigger circuit 311 is configured to operably trigger generating the ON time point signal S1C_S according to a rising edge of the switching signal S1C when the switching signal S1C is switched to high level. The function calculation and timer circuit 313 is reset according to the ON time point signal S1C_S; after the reset, the function calculation and timer circuit 313 introduce a related signal (which can be, for example but not limited to, the feedback compensation signal COMP) of the output current Iout into the frequency lower limit function, so as to obtain a corresponding lower limit frequency FR_LL, and the function calculation and timer circuit 313 calculates a reciprocal of the lower limit frequency FR_LL, to obtain a frequency lower limit masking period Tfr_l1. Besides, the function calculation and timer circuit 313 counts a lower limit selection period Tlls before the frequency lower limit masking period Tfr_l1 ends, for example by a timer therein, (i.e., note that the lower limit selection period Tlls is prior to an end time point of the frequency lower limit masking period Tfr_l1), so as to generate the frequency lower limit masking signal FR_LLW, wherein the frequency lower limit masking signal FR_LLW is indicative of the frequency lower limit masking period Tfr_l1 starting from a turned-ON time point of the primary side switch S1, and the lower limit selection period Tlls.

Figure 13:
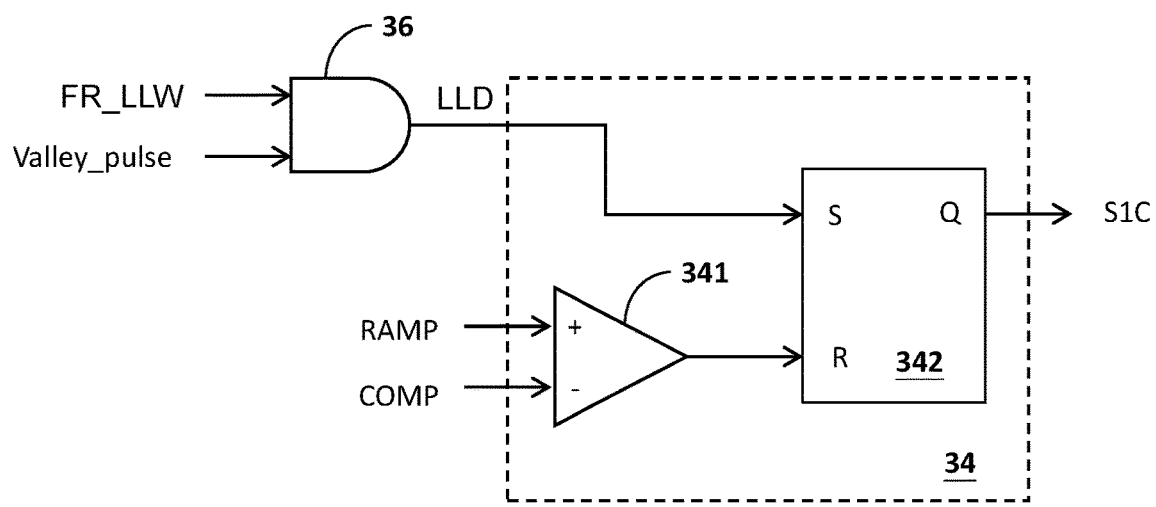
FIG. 13 shows an embodiment of a lower limit determination circuit and an embodiment of a switching signal generation circuit.

Please refer to FIG. 13, which shows an embodiment of a lower limit determination circuit (i.e., lower limit determination circuit 36) and an embodiment of a switching signal generation circuit (i.e., switching signal generation circuit 34). As shown in FIG. 13, the lower limit determination circuit 36 can include, for example but not limited to, an AND logic gate which receives the frequency lower limit masking signal FR_LLW and the valley detection signal Valley_pulse. Please refer to FIG. 13 along with FIG. 9B. As an example, during the lower limit selection period Tlls (which is prior to an end time point of the frequency upper limit masking period Tfr_ll1), the valley detection signal Valley_pulse has a pulse at the time point t3. Thus, by logic operation conducted by the AND logic gate of the lower limit determination circuit 36, the lower limit determination signal LLD generates a pulse at the time point t3, indicating an occurrence time point of a first valley of the ringing signal Sring in the lower limit selection period Tlls, which is determined as the occurrence time point of a lower limit locked valley. Note that it is not necessarily the first valley, but can be the last valley or a valley of any other serial number, and the lower limit determination circuit 36 can be correspondingly designed according to the requirement and the period of the ringing signal Sring.

Please still refer to FIG. 13. As shown in FIG. 13, the switching signal generation circuit 34 for example includes: a comparison circuit 341 and a logic circuit 342. The comparison circuit 341 is configured to operably compare the feedback compensation signal COMP with the ramp signal RAMP, so as to generate a comparison signal. The ramp signal RAMP is correlated to a primary side current ILm flowing through the primary side winding W1. The primary side current ILm for example can be obtained according to a current sensing signal CS shown in FIG. 4; current sense technology is well known to those skilled in the art, so the details thereof are not redundantly explained here. The logic circuit 342 can be, for example but not limited to, a filp-flop circuit shown in FIG. 13. In this filp-flop circuit, a setting terminal S of the filp-flop circuit receives the lower limit determination signal LLD; a resetting terminal R of the filp-flop circuit receives the above-mentioned comparison signal; an output terminal Q of the filp-flop circuit generates the switching signal S1C. It should be understood that the implementation of the logic circuit 342 as a filp-flop circuit in the above-mentioned preferred embodiment is only an illustrative example, but not for limiting the scope of the present invention. In other embodiments, it is also practicable and within the scope of the present invention that the logic circuit 342 can be any other circuit as long as a switching signal S1C can be generated according to the comparison signal and the lower limit determination signal LLD, to properly control the power switch S1.

Figure 14A:
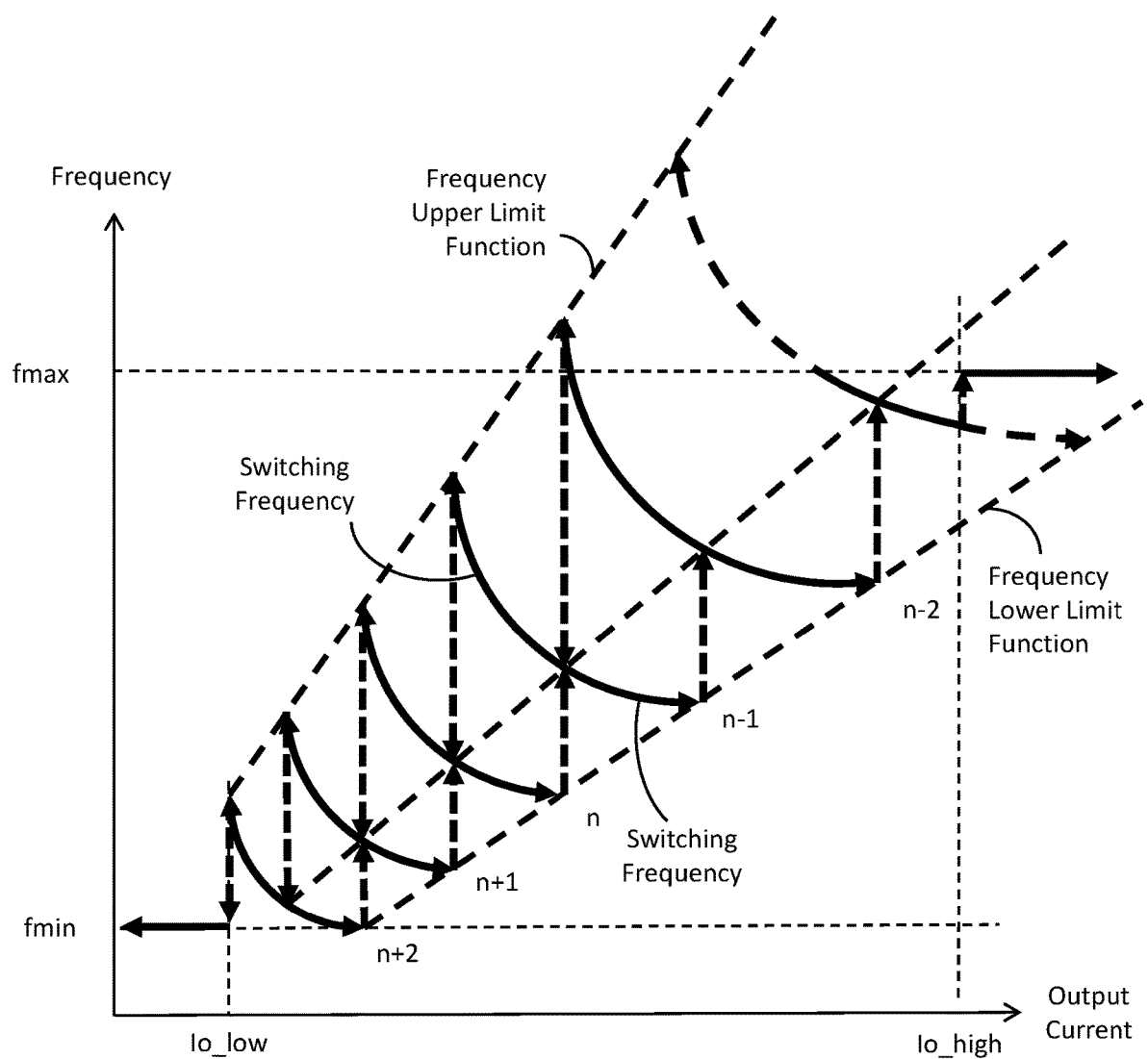
Figure 14B:
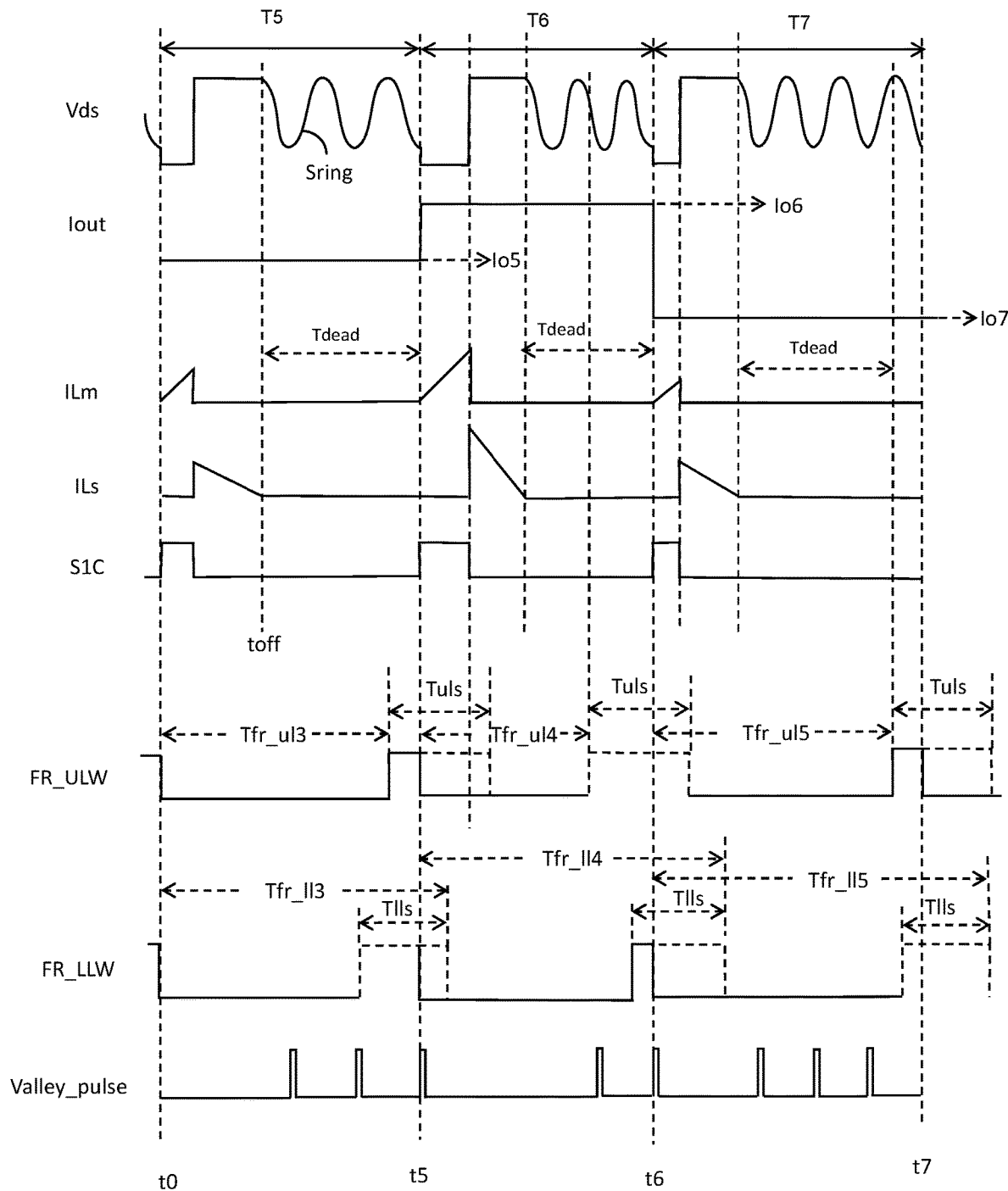
FIG. 14B shows signal waveforms of relevant signals of the embodiment shown in FIG. 14A wherein said another operation mechanism is conducted.

Please refer to FIG. 2A in conjugation with FIG. 14A and FIG. 14B. FIG. 14A shows a characteristic curve of relevant signals of the embodiment shown in FIG. 2A wherein another operation mechanism is conducted, whereas, FIG. 2C shows signal waveforms of relevant signals of the embodiment shown in FIG. 14A wherein said another operation mechanism is conducted. As shown in FIG. 14A and FIG. 14B, taking the flyback power converter circuit 1 shown in FIG. 2A as an example, the conversion control circuit 30 calculates an upper limit frequency corresponding to the output current Iout according to a frequency upper limit function, and obtains a frequency upper limit masking period (e.g. frequency upper limit masking period Tfr_ul3) according to a reciprocal of the upper limit frequency, wherein the frequency upper limit masking period is a period starting from a time point at which the primary side switch S1 begins to be turned ON. Besides, the conversion control circuit 30 calculates a lower limit frequency corresponding to the output current Iout according to a frequency lower limit function, and obtains a frequency lower limit masking period (e.g. frequency lower limit masking period Tfr_ll3) according to a reciprocal of the lower limit frequency, wherein the frequency lower limit masking period is a period starting from a time point at which the primary side switch S1 begins to be turned ON.

When a number of occurrence (referred to as "occurrence number") of valleys in the ringing signal Sring of the voltage Vds across the primary side switch S1 during the frequency upper limit masking period is not lower than an occurrence number of valleys in the ringing signal Sring during a previous frequency upper limit masking period in a previous switching period (i.e. previous cycle), during an upper limit selection period, the conversion control circuit 30 selects a specific valley among the valleys in the ringing signal Sring as an upper limit locked valley, and the conversion control circuit 30 once again turns ON the primary side switch S1 at the occurrence time point of the upper limit locked valley, wherein the above-mentioned upper limit selection period is a period starting from a time point at which a present frequency upper limit masking period of a present switching period ends. On the other hand, when an occurrence number of valleys in the ringing signal Sring of the voltage Vds across the primary side switch S1 during the frequency upper limit masking period is lower than an occurrence number of valleys in the ringing signal Sring during the previous frequency upper limit masking period in the previous switching period, during a lower limit selection period, the conversion control circuit 30 selects a specific valley among the valleys in the ringing signal Sring as a lower limit locked valley, so that the conversion control circuit 30 once again turns ON the primary side switch S1 at the occurrence time point of the lower limit locked valley, wherein the above-mentioned lower limit selection period is a period prior to a time point at which a present frequency lower limit masking period of the present switching period ends.

The frequency upper limit masking period is inversely correlated to a level of the output current Iout. And, the frequency lower limit masking period is inversely correlated to a level of the output current Iout. A switching period is defined as a period between the turned-ON time points of the primary side switch S1 at two immediately consecutive cycles. The conversion control circuit 30 is configured to operably adjust an ON period of the primary side switch S1 according to the feedback compensation signal COMP, so as to regulate the output voltage Vout or the output current Iout. A reciprocal of the switching period is defined as a switching frequency. The switching frequency is not higher than the upper limit frequency and the switching frequency is not lower than the lower limit frequency in the DCM. The upper limit frequency can be for example a frequency corresponding to the frequency upper limit function shown in FIG. 14A.

The lower limit frequency can be for example a frequency corresponding to the frequency lower limit function shown in FIG. 14A.

Figure 15:
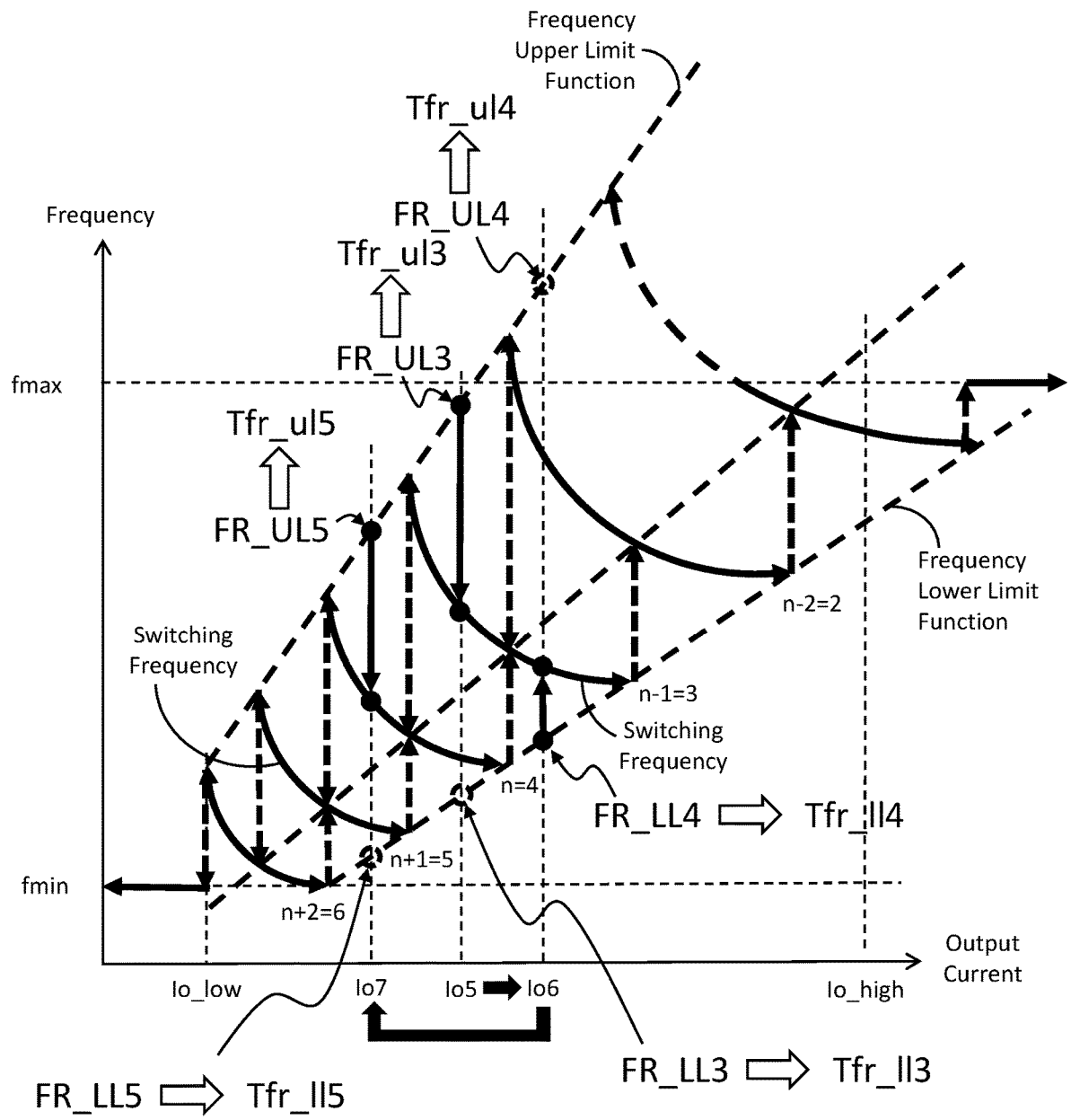
FIG. 15 shows a characteristic curve of switching frequency versus output current in a flyback power converter circuit of the present invention as shown in FIG. 14A.

To elaborate in more detail, please refer to FIG. 15 which shows a characteristic curve of switching frequency versus output current in a flyback power converter circuit of the present invention as shown in FIG. 14A. FIG. 15 demonstrates that: in a case where the output current Iout first rises from the level Io5 to the level Io6 as the load condition of the circuit 50 increases and next the output current Iout drops from the level Io6 to the level Io7 as the load condition of the load circuit 50 decreases, how the present invention can determine the upper limit locked valley or the lower limit locked valley and determine a time point at which the primary side switch S1 begins to be turned ON.

Please refer to FIG. 15 along with FIG. 14B. When a related signal (which can be, for example but not limited to, the feedback compensation signal COMP) of the level Io5 of the output current Iout is introduced to the frequency upper limit function, a corresponding upper limit frequency FR_UL3 can be obtained. The conversion control circuit 30 obtains a frequency upper limit masking period Tfr_ul3 according to a reciprocal of the upper limit frequency FR_UL3, wherein the frequency upper limit masking period Tfr_ul3 is a period starting from a time point (i.e., time point t0) at which the primary side switch S1 begins to be turned ON. And, during an upper limit selection period Tuls, the conversion control circuit 30 selects a first valley in the ringing signal Sring as an upper limit locked valley, whereby the conversion control circuit 30 once again turns ON the primary side switch S1 at the occurrence time point t5 of the upper limit locked valley, wherein the upper limit selection period Tuls is a period starting from a time point at which the frequency upper limit masking period Tfr_ul3 ends.

Please still refer to FIG. 15 along with FIG. 14B. When the output current Iout increases from Io5 to Io6, a related signal (which can be, for example but not limited to, the feedback compensation signal COMP) of the output current Iout is introduced to the frequency upper limit function, to obtain a corresponding upper limit frequency FR_UL4. A frequency upper limit masking period Tfr_ul4 is obtained according to a reciprocal of the upper limit frequency FR_UL4, wherein the frequency upper limit masking period Tfr_ul4 is a period starting from a time point (i.e., time point t5) at which the primary side switch S1 begins to be turned ON. In this embodiment, the number of valley(s) occurring in the ringing signal Sring during the frequency upper limit masking period Tfr_ul4 in the switching period T6 is equal to one. That is, the occurrence number of valley(s) during the present frequency upper limit masking period Tfr_ul4 in the present switching period T6 is lower than the occurrence number of valleys in the ringing signal Sring during the previous frequency upper limit masking period Tfr_ul3 in the previous switching period T5 (referring to the waveform of the frequency upper limit masking signal FR_ULW in FIG. 14B; the occurrence number of valleys in the ringing signal Sring during the frequency upper limit masking period Tfr_ul3 is equal to two).

As a result, the conversion control circuit 30 obtains such information that: as compared to the previous switching period T5, the output current Iout is increased in the present switching period T6. Accordingly, under such situation, the feedback compensation signal COMP is introduced to the frequency lower limit function, to obtain a corresponding lower limit frequency FR_LL4; a frequency lower limit masking period Tfr_ll4 is obtained according to a reciprocal of the lower limit frequency FR_LL4, wherein the frequency lower limit masking period Tfr_ll4 is a period starting from a time point (i.e., time point t5) at which the primary side switch S1 begins to be turned ON. And, during a lower limit selection period Tlls, the conversion control circuit 30 selects a specific valley, for example but not limited to, a first valley (i.e., a valley in the lower limit selection period Tlls that is closest to a starting time point of the frequency lower limit masking period Tfr_ll4), in a ringing signal Sring of a voltage Vds across the primary side switch S1, as a lower limit locked valley, whereby the conversion control circuit 30 once again turns ON the primary side switch S1 at an occurrence time point t6 of the lower limit locked valley, wherein the lower limit selection period Tlls is a period prior to a time point at which the frequency lower limit masking period Tfr_ll4 ends.

Please still refer to FIG. 15 along with FIG. 14B. When the output current Iout drops from Io6 to Io7, related signal (which can be, for example but not limited to, the feedback compensation signal COMP) of the output current Iout is introduced to the frequency upper limit function, to obtain a corresponding upper limit frequency FR_UL5. A frequency upper limit masking period Tfr_ul5 is obtained according to a reciprocal of the upper limit frequency FR_UL5, wherein the frequency upper limit masking period Tfr_ul5 is a period starting from a time point (i.e., time point t6) at which the primary side switch S1 begins to be turned ON. In this embodiment, an occurrence number of valleys in a ringing signal Sring during the frequency upper limit masking period Tfr_ul5 in the switching period T7 is equal to three (referring to a waveform of the frequency upper limit masking signal FR_ULW shown in FIG. 14B). That is, an occurrence number of a ringing signal Sring during the present frequency upper limit masking period Tfr_ul5 in the present switching period T7 is higher than an occurrence number of valleys in the ringing signal Sring during the previous frequency upper limit masking period Tfr_ul4 in the previous switching period T6 (referring to the frequency upper limit masking signal FR_ULW in FIG. 14B, the occurrence number of valley(s) in the ringing signal Sring during the previous frequency upper limit masking period Tfr_ul4 in the previous switching period T6 is equal to one).

As a result, the conversion control circuit 30 obtains such information that: as compared to the previous switching period T6, the output current Iout is decreased in the present switching period T7. Accordingly, under such situation, during an upper limit selection period Tuls, the conversion control circuit 30 selects a first valley in the ringing signal Sring of the voltage Vds across the primary side switch S1 as an upper limit locked valley, whereby the conversion control circuit 30 once again turns ON the primary side switch S1 at the occurrence time point t7 of the upper limit locked valley, wherein the upper limit selection period Tuls is a period starting from a time point at which the frequency upper limit masking period Tfr_ul5 ends.

Please still refer to FIG. 15 along with FIG. 14B. As described above, a switching period is defined as a period between the turned-ON time points of the primary side switch S1 at two immediately consecutive cycles. That is, a switching period T5 is defined as a period ranging from the timing point t0 to the timing point t5, as shown in FIG. 14B; a switching period T6 is defined as a period ranging from the timing point t5 to the timing point t6; a switching period T7 is defined as a period ranging from the timing point t6 to the timing point t7, as shown in FIG. 14B. In FIG. 15 and FIG. 14B, the upper limit frequency FR_UL4, the frequency upper limit masking period Tfr_ul4, the lower limit frequency FR_LL3, the frequency lower limit masking period Tfr_ll3, the lower limit frequency FR_LL5 and the frequency lower limit masking period Tfr_ll5 which are not adopted are still illustrated for reference.

In one embodiment, the feedback circuit 40 is configured to operably generate the feedback compensation signal COMP according to the output current Iout. The conversion control circuit 30 is configured to operably determine the frequency upper limit masking period and the frequency lower limit masking period according to the feedback compensation signal COMP.

Please refer to FIG. 4. In one embodiment, the power transformer 10 of the flyback power converter circuit 3 further comprises an auxiliary winding WA, which is configured to operably sense a voltage Vds across a primary side switch S1, so as to generate an auxiliary signal VAUX. The thus generated auxiliary signal VAUX can supply information of the ringing signal Sring to the conversion control circuit 30.

In one embodiment, on one hand, when an occurrence number of valleys in the ringing signal Sring of the voltage Vds across the primary side switch S1 during the frequency upper limit masking period is not lower than an occurrence number of valleys in the ringing signal Sring during a previous frequency upper limit masking period in a previous switching period, during an upper limit selection period, the conversion control circuit 30 selects a first valley or a valley of a predetermined serial number among the valleys in the ringing signal Sring as an upper limit locked valley, wherein the above-mentioned upper limit selection period is a period starting from a time point at which the present frequency upper limit masking period of the present switching period ends. On the other hand, when an occurrence number of the valleys in the ringing signal Sring of the voltage Vds across the primary side switch S1 during the frequency upper limit masking period is lower than an occurrence number of valleys in the ringing signal Sring during the previous frequency upper limit masking period in the previous switching period, during a lower limit selection period, the conversion control circuit 30 selects a first valley or a valley of a predetermined serial number among the valleys in the ringing signal Sring as a lower limit locked valley, wherein the above-mentioned lower limit selection period is a period prior to a time point at which a present frequency lower limit masking period of the present switching period ends.

In one embodiment, as shown in FIG. 15, the frequency upper limit function and the frequency lower limit function are both linear function of frequency versus output current Iout. And, the slope of the frequency upper limit function is greater than the slope of the frequency lower limit function.

It is noteworthy that, in this embodiment, a thick black solid curve as shown in FIG. 15 indicates a relationship between the switching frequency and the output current Iout under an implementation wherein the primary side switch S1 is turned ON at an occurrence time point of an upper limit locked valley or a lower limit locked valley. Different thick black solid curves represent different valleys in the ringing signal Sring. For example, the (n−2)th valley indicates a second valley in the ringing signal Sring, the (n−1)th valley indicates a third valley in the ringing signal Sring, the nth valley indicates a fourth valley in the ringing signal Sring, the (n+1)th valley indicates a fifth valley in the ringing signal Sring and the (n+2)th valley indicates a sixth valley in the ringing signal Sring. the "nth" valley is the serial number counted from the start of the ringing signal Sring, or from the start of the dead time Tdead, but not from the start of the upper limit selection period Tuls.

In one embodiment, the upper limit selection period Tuls is a predetermined value which can be determined by a user taking into consideration the period of the ringing signal Sring and a time out requirement. In other embodiments, the upper limit selection period Tuls can be adaptively adjusted according to circuit design. Besides, in one embodiment, the lower limit selection period Tlls is a predetermined value which can be determined by a user taking into consideration the period of the ringing signal Sring. In other embodiments, the lower limit selection period Tlls can be adaptively adjusted according to circuit design.

It is noteworthy that, FIG. 14B also shows waveforms of the primary side current ILm flowing through the primary side switch S1 and the secondary side current ILs. As shown in FIG. 14B, during a dead time Tdead between a time point toff at which the secondary side current ILs drops to zero and a time point (e.g., t5) at which the primary side switch S1 is once again turned ON, the voltage Vds across the primary side switch has a ringing signal Sring.

Figure 16:
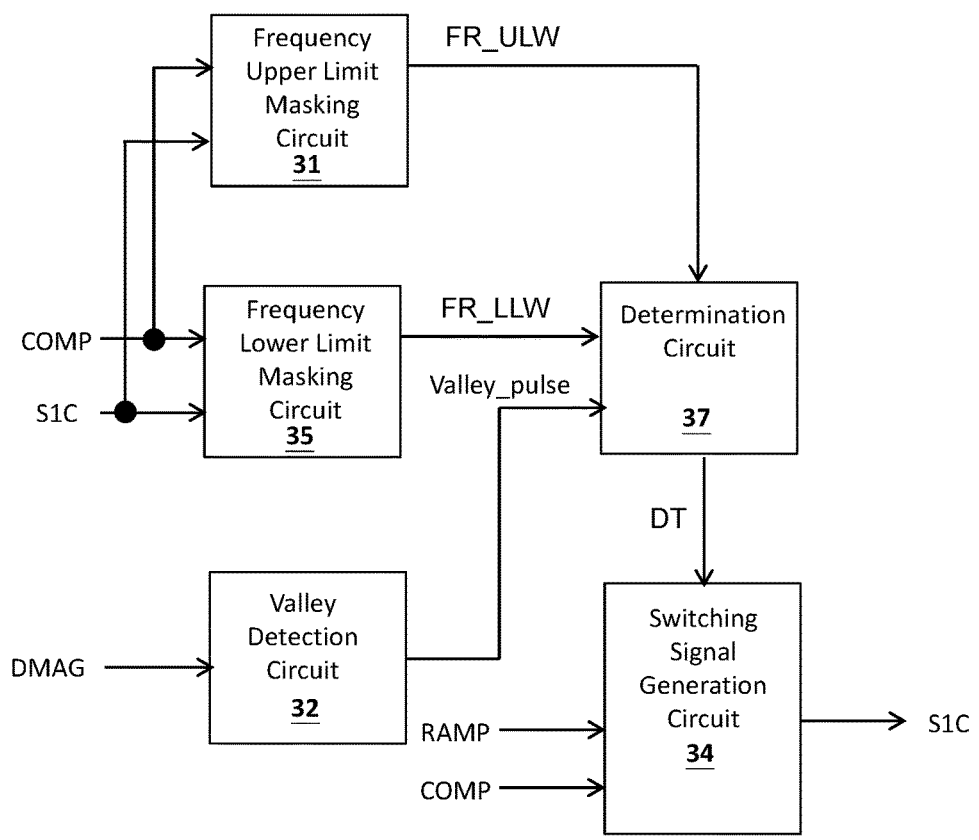
FIG. 16 shows a schematic diagram of a conversion control circuit according to another embodiment of the present invention.

Please refer to FIG. 16, which shows a schematic diagram of a conversion control circuit 30 according to another embodiment of the present invention. As shown in FIG. 16, the conversion control circuit 30 includes: a frequency upper limit masking circuit 31, a valley detection circuit 32, a frequency lower limit masking circuit 35, a determination circuit 37 and a switching signal generation circuit 34.

The frequency upper limit masking circuit 31 is configured to operably obtain a turned-ON time point of the primary side switch S1 according to the switching signal S1C, and calculate the frequency upper limit masking period Tfr_ul according to the feedback compensation signal COMP related to the output current Iout, so as to generate a frequency upper limit masking signal FR_ULW.

The frequency lower limit masking circuit 35 is configured to operably obtain a turned-ON time point of the primary side switch S1 according to the switching signal S1C, so as to generate an ON time point signal S1C_S, and the frequency lower limit masking circuit 35 is configured to operably calculate the frequency lower limit masking period Tfr_ll according to the feedback compensation signal COMP related to the output current Iout, so as to generate a frequency lower limit masking signal FR_LLW.

The valley detection circuit 32 is configured to operably generate a valley detection signal Valley_pulse according to a magnetic induction signal DMAG related to the ringing signal Sring, wherein the valley detection signal Valley_pulse is indicative of an occurrence time point of at least one valley in the ringing signal Sring during the dead time Tdead.

The determination circuit 37 is configured to operably determine whether the occurrence number of the valleys in the ringing signal Sring during the frequency upper limit masking period is lower than the occurrence number of valleys in the ringing signal Sring during the previous switching period according to the frequency upper limit masking signal FR_ULW, the frequency lower limit masking signal FR_LLW and the valley detection signal Valley_pulse, so as to generate a determination signal DT.

On one hand, when an occurrence number of valleys in the ringing signal Sring of the voltage Vds across the primary side switch S1 during the frequency upper limit masking period is not lower than an occurrence number of valleys in the ringing signal Sring during a previous frequency upper limit masking period in a previous switching period, during an upper limit selection period, the switching signal generation circuit 34 of the conversion control circuit 30 selects a specific valley among the valleys in the ringing signal Sring as an upper limit locked valley, so that the switching signal generation circuit 34 of the conversion control circuit 30 once again turns ON the primary side switch S1 at an occurrence time point of the upper limit locked valley, wherein the above-mentioned upper limit selection period is a period starting from a time point at which a present frequency upper limit masking period of a present switching period ends. On the other hand, when an occurrence number of the valleys in the ringing signal Sring of the voltage Vds across the primary side switch S1 during the frequency upper limit masking period is lower than an occurrence number of valleys in the ringing signal Sring during the previous frequency upper limit masking period in the previous switching period, during a lower limit selection period, the switching signal generation circuit 34 of the conversion control circuit 30 selects a specific valley among the valleys in the ringing signal Sring as a lower limit locked valley, so that the switching signal generation circuit 34 of the conversion control circuit 30 once again turns ON the primary side switch S1 at an occurrence time point of the lower limit locked valley, wherein the above-mentioned lower limit selection period is a period prior to a time point at which a present frequency lower limit masking period of the present switching period ends.

In one embodiment, the determination circuit 37 can be implemented as for example a simple logic operation circuit, to determine the relationship between the valley detection signal Valley_pulse and the frequency upper limit masking signal FR_ULW and the frequency lower limit masking signal FR_LLW. Logic operation circuits are well known to those skilled in the art, so the details thereof are not redundantly explained here.

Figure 17:
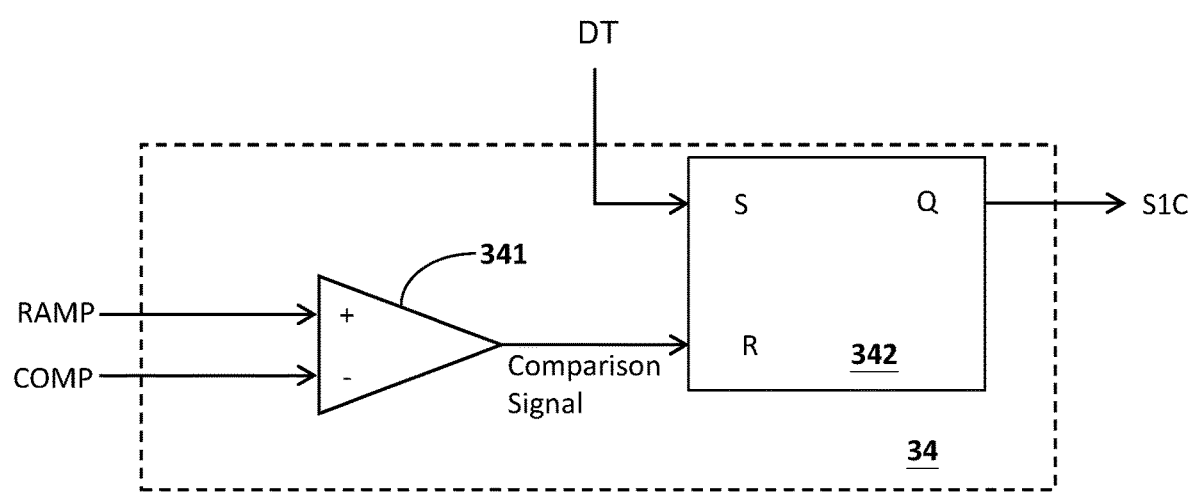
FIG. 17 shows an embodiment of a switching signal generation circuit.

Please refer to FIG. 17, which shows an embodiment of a switching signal generation circuit (i.e., switching signal generation circuit 34). As shown in FIG. 17, the switching signal generation circuit 34 for example includes: a comparison circuit 341 and a logic circuit 342. The comparison circuit 341 is configured to operably compare the feedback compensation signal COMP with the ramp signal RAMP, so as to generate a comparison signal. The ramp signal RAMP is correlated to a primary side current ILm flowing through the primary side winding W1. The primary side current ILm for example can be obtained according to a current sensing signal CS shown in FIG. 4; current sense technology is well known to those skilled in the art, so the details thereof are not redundantly explained here. The logic circuit 342 can be, for example but not limited to, a filp-flop circuit shown in FIG. 17. In this filp-flop circuit, a setting terminal S of the filp-flop circuit receives the determination signal DT; a resetting terminal R of the filp-flop circuit receives the above-mentioned comparison signal; an output terminal Q of the filp-flop circuit generates the switching signal S1C. It should be understood that the implementation of the logic circuit 342 as a filp-flop circuit in the above-mentioned preferred embodiment is only an illustrative example, but not for limiting the scope of the present invention. In other embodiments, it is also practicable and within the scope of the present invention that the logic circuit 342 can be any other circuit as long as a switching signal S1C can be generated according to the comparison signal and the determination signal DT to properly control the power switch S1.

Figure 18:
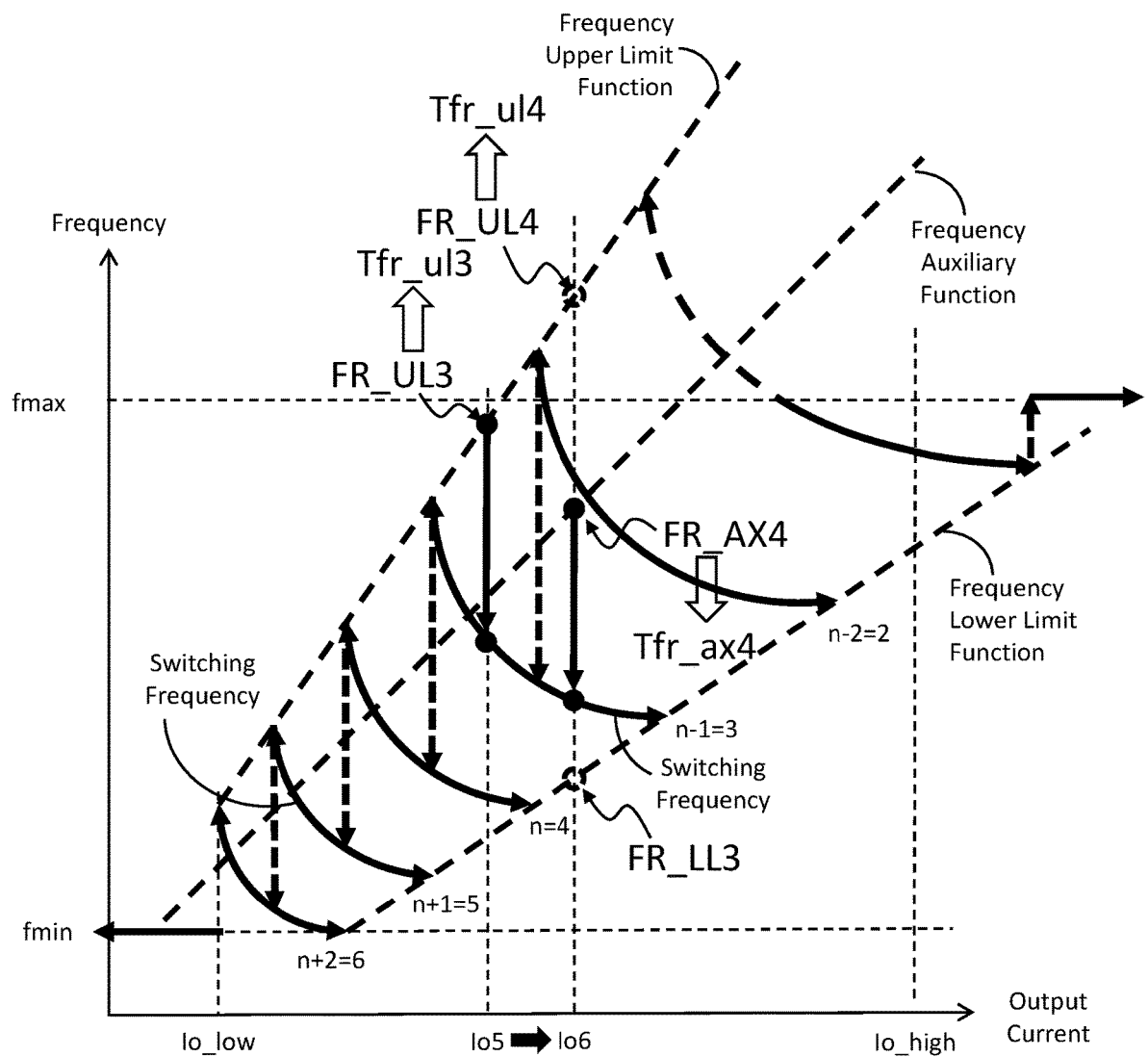
FIG. 18 shows a characteristic curve of switching frequency versus output current in a flyback power converter circuit of the present invention wherein another operation mechanism is conducted.

Please refer to FIG. 18, which shows a characteristic curve of switching frequency versus output current in a flyback power converter circuit of the present invention wherein another operation mechanism is conducted. The operation mechanism shown in FIG. 18 is similar to the operation mechanism shown in FIG. 15. In this embodiment, FIG. 18 demonstrates that: in a case where the output current Iout rises from the level Io5 to the level Io6 as the load condition of the load circuit 50 increases, how the present invention can determine a time point at which the primary side switch S1 begins to be turned ON via another approach.

As shown in FIG. 18, when a related signal (which can be, for example but not limited to, the feedback compensation signal COMP) of the output current Iout is introduced to the frequency upper limit function, a corresponding upper limit frequency FR_UL3 can be obtained. A frequency upper limit masking period Tfr_ul3 is obtained according to a reciprocal of the upper limit frequency FR_UL3, wherein the frequency upper limit masking period Tfr_ul3 is a period starting from a time point (i.e., time point t0) at which the primary side switch S1 begins to be turned ON. And, during an upper limit selection period Tuls, the conversion control circuit 30 selects a first valley in the ringing signal Sring of the voltage Vds across the primary side switch S1 as an upper limit locked valley, whereby the conversion control circuit 30 once again turns ON the primary side switch S1 at an occurrence time point t5 of the upper limit locked valley, wherein the upper limit selection period Tuls is a period starting from a time point at which the frequency upper limit masking period Tfr_ul3 ends.

The operation mechanism shown in FIG. 18 is different from the operation mechanism shown in FIG. 15, in the following: in the operation mechanism shown in FIG. 18, in a case where the output current Iout rises from the level of Io5 to the level of Io6, when a related signal (which can be, for example but not limited to, the feedback compensation signal COMP) of the output current Iout is introduced to the frequency upper limit function, to obtain a corresponding upper limit frequency FR_UL4. A frequency upper limit masking period Tfr_ul4 is obtained according to a reciprocal of the upper limit frequency FR_UL4, wherein the frequency upper limit masking period Tfr_ul4 is a period starting from a time point (i.e., time point t5) at which the primary side switch S1 begins to be turned ON. When an occurrence number of a ringing signal Sring during the present frequency upper limit masking period Tfr_ul4 in the present switching period T6 (referring to the waveform of the frequency upper limit masking signal FR_ULW in FIG. 14B, the occurrence number of valley(s) in the ringing signal Sring during the present frequency upper limit masking period Tfr_ul4 in the present switching period T6 is equal to one) is lower than an occurrence number of valleys in the ringing signal Sring during the previous frequency upper limit masking period Tfr_ul3 in the previous switching period T5 (referring to the waveform of the frequency upper limit masking signal FR_ULW in FIG. 14B, the occurrence number of valleys in the ringing signal Sring during the previous frequency upper limit masking period Tfr_ul3 in the previous switching period T5 is equal to two), the conversion control circuit 30 calculates an auxiliary frequency FR_AX4 (rather than the lower limit frequency FR_LL1 shown in FIG. 15) corresponding to the output current Iout according to a frequency auxiliary function (rather than the frequency lower limit function shown in FIG. 15), and the conversion control circuit 30 obtains a frequency auxiliary masking period Tfr_ax4 according to a reciprocal of the auxiliary frequency FR_AX4, wherein the frequency auxiliary masking period Tfr_ax4 is a period starting from the time point at which the primary side switch S1 begins to be turned ON. Besides, during an auxiliary selection period, the conversion control circuit 30 selects a lower limit locked valley, whereby the conversion control circuit 30 once again turns ON the primary side switch S1 at the occurrence time point of the lower limit locked valley, wherein the auxiliary selection period is a period starting from a time point at which the frequency auxiliary masking period Tfr_ax4 ends. The frequency auxiliary masking period Tfr_ax4 is between the frequency upper limit masking period Tfr_ul4 and the frequency lower limit masking period Tfr_ll3.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A flyback power converter circuit, which is configured to operably convert an input power to an output power, so as to supply the output power to a load circuit, wherein the input power includes an input voltage and an input current, whereas, the output power includes an output voltage and an output current; the flyback power converter circuit comprising:

a power transformer, which is coupled between the input voltage and the output voltage via electromagnetic induction, wherein the power transformer includes: a primary side winding coupled to the input voltage and a secondary side winding coupled to the output voltage;

a primary side switch coupled to the primary side winding, wherein the primary side switch is configured to operably control the primary side winding, so as to convert the input voltage, whereby the secondary side winding generates the output voltage; and a conversion control circuit, which is configured to operably generate a switching signal according to a feedback compensation signal, so as to control the primary side switch, thus controlling the primary side winding;

wherein in a discontinuous conduction mode (DCM), during a dead time, the conversion control circuit is configured to operably calculate an upper limit frequency corresponding to the output current according to a frequency upper limit function, and to operably obtain a frequency upper limit masking period according to a reciprocal of the upper limit frequency, wherein the frequency upper limit masking period is a period starting from a time point at which the primary side switch begins to be turned ON; and wherein during an upper limit selection period, the conversion control circuit is configured to operably select a valley among one or more valleys in a ringing signal related to a voltage across the primary side switch as an upper limit locked valley, so that the conversion control circuit once again turns ON the primary side switch at an occurrence time point of the upper limit locked valley, wherein the upper limit selection period is a period starting from a time point at which the frequency upper limit masking period ends;

wherein the frequency upper limit masking period is inversely correlated to a level of the output current;

wherein a switching period is defined as a period between turned-ON time points of the primary side switch at two immediately consecutive cycles;

wherein the conversion control circuit is configured to operably adjust an ON period of the primary side switch according to the feedback compensation signal, so as to regulate the output voltage or the output current;

wherein a reciprocal of the switching period is defined as a switching frequency, and wherein the switching frequency is not higher than the upper limit frequency in the DCM.

2. The flyback power converter circuit of claim 1, further comprising:
a feedback circuit, which is configured to operably generate the feedback compensation signal according to the output current;
wherein the conversion control circuit is configured to operably determine the frequency upper limit masking period according to the feedback compensation signal.

3. The flyback power converter circuit of claim 1, wherein the power transformer furtherer includes: an auxiliary winding, which is configured to operably sense the voltage across the primary side switch, so as to generate an auxiliary signal, thereby obtaining information of the ringing signal.

4. The flyback power converter circuit of claim 1, wherein during the upper limit selection period, the conversion control circuit is configured to operably select a first valley or a valley of a predetermined serial number among the one or more valleys in the ringing signal as the upper limit locked valley.

5. The flyback power converter circuit of claim 1, wherein the conversion control circuit includes:
a frequency upper limit masking circuit, which is configured to operably obtain a turned-ON time point according to the switching signal, and to operably calculate the frequency upper limit masking period according to the feedback compensation signal related to the output current, so as to generate a frequency upper limit masking signal;
a valley detection circuit, which is configured to operably generate a valley detection signal according to the ringing signal, wherein the valley detection signal is indicative of an occurrence time point of at least one valley in the ringing signal during the dead time;
an upper limit determination circuit, which is configured to operably select a valley of a predetermined serial number as the occurrence time point of the upper limit locked valley according to the frequency upper limit masking signal and the valley detection signal during the upper limit selection period, so as to generate an upper limit determination signal; and
a switching signal generation circuit, which is configured to operably compare the feedback compensation signal with a ramp signal, so as to generate a reset signal, and to operably generate the switching signal according to the reset signal and the upper limit determination signal.

6. The flyback power converter circuit of claim 5, wherein the switching signal generation circuit includes:
a comparison circuit, which is configured to operably compare the feedback compensation signal with the ramp signal, so as to generate a comparison signal; wherein the ramp signal is correlated to a primary side current flowing through the primary side winding; and
a logic circuit, which is configured to operably generate the switching signal according to the comparison signal and the upper limit determination signal.

7. A conversion control circuit for use in a flyback power converter circuit, wherein the flyback power converter circuit is configured to operably generate a switching signal for controlling a primary side switch, so as to control the primary side winding of a power transformer of the flyback power converter circuit, thereby converting an input power to an output power at a secondary side winding of the power transformer; the conversion control circuit comprising:
a frequency upper limit masking circuit, which is configured to operably obtain a turned-ON time point according to the switching signal, wherein in a discontinuous conduction mode (DCM), during a dead time, the frequency upper limit masking circuit is configured to operably obtain a frequency upper limit masking period according to a reciprocal of the upper limit frequency, so as to generate a frequency upper limit masking signal, wherein the frequency upper limit masking period is a period starting from a time point at which the primary side switch begins to be turned ON;
a valley detection circuit, which is configured to operably generate a valley detection signal according to a ringing signal related to a voltage across the primary side switch, wherein the valley detection signal is indicative of an occurrence time point of at least one valley in the ringing signal during the dead time;
an upper limit determination circuit, which is configured to operably select a valley of a predetermined serial number as the occurrence time point of the upper limit locked valley according to the frequency upper limit masking signal and the valley detection signal during an upper limit selection period, so as to generate an upper limit determination signal, wherein the upper limit selection period is a period starting from a time point at which the frequency upper limit masking period ends; and
a switching signal generation circuit, which is configured to operably compare the feedback compensation signal with a ramp signal, so as to generate a reset signal, wherein the switching signal generation circuit is configured to operably generate the switching signal according to the reset signal and the upper limit determination signal, so that the conversion control circuit once again turns ON the primary side switch at an occurrence time point of the upper limit locked valley;

wherein the frequency upper limit masking period is inversely correlated to a level of the output current;

wherein a switching period is defined as a period between turned-ON time points of the primary side switch at two immediately consecutive cycles;

wherein the conversion control circuit is configured to operably adjust an ON period of the primary side switch according to the feedback compensation signal, so as to regulate the output voltage or the output current;

wherein a reciprocal of the switching period is defined as a switching frequency, and wherein the switching frequency is not higher than the upper limit frequency in the DCM.

8. The conversion control circuit of claim 7, further comprising:
a feedback circuit, which is configured to operably generate the feedback compensation signal according to the output current;
wherein the conversion control circuit is configured to operably determine the frequency upper limit masking period according to the feedback compensation signal.

9. The conversion control circuit of claim 7, wherein the power transformer furtherer includes: an auxiliary winding, which is configured to operably sense the voltage across the primary side switch, so as to generate an auxiliary signal, thereby obtaining information of the ringing signal.

10. The conversion control circuit of claim 7, wherein during the upper limit selection period, the conversion control circuit is configured to operably select a first valley or a valley of a predetermined serial number among the one or more valleys in the ringing signal as the upper limit locked valley.

11. The conversion control circuit of claim 7, wherein the switching signal generation circuit includes:
a comparison circuit, which is configured to operably compare the feedback compensation signal with the ramp signal, so as to generate a comparison signal; wherein the ramp signal is correlated to a primary side current flowing through the primary side winding; and
a logic circuit, which is configured to operably generate the switching signal according to the comparison signal and the upper limit determination signal.

12. A control method, which is configured to operably control a flyback power converter circuit, so that an input power is converted to an output power, thus supplying the output power to a load circuit; the control method comprising:
generating a switching signal according to a feedback compensation signal, so as to control the primary side switch and thereby controlling the primary side winding, to convert the input power to the output power at a secondary side winding of the power transformer;
in a case wherein the flyback power converter circuit operates in a discontinuous conduction mode (DCM), during a dead time in the DCM, calculating an upper limit frequency corresponding to the output current according to a frequency upper limit function, and obtaining a frequency upper limit masking period according to a reciprocal of the upper limit frequency, wherein the frequency upper limit masking period is a period starting from a time point at which the primary side switch begins to be turned ON;
during an upper limit selection period, selecting a valley among one or more valleys in a ringing signal related to a voltage across the primary side switch as an upper limit locked valley, so as to once again turn ON the primary side switch at an occurrence time point of the upper limit locked valley, wherein the upper limit selection period is a period starting from a time point at which the frequency upper limit masking period ends; and adjusting an ON period of the primary side switch according to the feedback compensation signal, so as to regulate the output voltage or the output current;
wherein the frequency upper limit masking period is inversely correlated to a level of the output current;
wherein a switching period is defined as a period between turned-ON time points of the primary side switch at two immediately consecutive cycles;
wherein a reciprocal of the switching period is defined as a switching frequency, and wherein the switching frequency is not higher than the upper limit frequency in the DCM.

13. The control method of claim 12, further comprising:
generating the feedback compensation signal according to the output current;
determining the frequency upper limit masking period according to the feedback compensation signal.

14. The control method of claim 12, further comprising:
sensing the voltage across the primary side switch, so as to generate an auxiliary signal, thereby obtaining information of the ringing signal.

15. The control method of claim 12, wherein during the upper limit selection period, selecting a first valley or a valley of a predetermined serial number among the one or more valleys in the ringing signal as the upper limit locked valley.

16. A flyback power converter circuit, which is configured to operably convert an input power to an output power, so as to supply the output power to a load circuit, wherein the input power includes an input voltage and an input current, whereas, the output power includes an output voltage and an output current; the flyback power converter circuit comprising:
a power transformer, which is coupled between the input voltage and the output voltage via electromagnetic induction, wherein the power transformer includes a primary side winding coupled to the input voltage and a secondary side winding coupled to the output voltage;
a primary side switch coupled to the primary side winding, wherein the primary side switch is configured to operably control the primary side winding, so as to convert the input voltage, whereby the secondary side winding generates the output voltage; and
a conversion control circuit, which is configured to operably generate a switching signal according to a feedback compensation signal, so as to control the primary side switch, thus controlling the primary side winding;
wherein in a discontinuous conduction mode (DCM), during a dead time, the conversion control circuit is configured to operably calculate a lower limit frequency corresponding to the output current according to a frequency lower limit function, and to operably obtain a frequency lower limit masking period according to a reciprocal of the lower limit frequency, wherein the frequency lower limit masking period is a period starting from a time point at which the primary side switch begins to be turned ON; and wherein during a lower limit selection period, the conversion control circuit is configured to operably select a valley among one or more valleys in a ringing signal related to a voltage across the primary side switch as a lower limit locked valley, so that the conversion control circuit once again turns ON the primary side switch at an occurrence time point of the lower limit locked valley, wherein the lower limit selection period is a period prior to a time point at which the frequency lower limit masking period ends;

wherein the frequency lower limit masking period is inversely correlated to a level of the output current;

wherein a switching period is defined as a period between turned-ON time points of the primary side switch at two immediately consecutive cycles;

wherein the conversion control circuit is configured to operably adjust an ON period of the primary side switch according to the feedback compensation signal, so as to regulate the output voltage or the output current;

wherein a reciprocal of the switching period is defined as a switching frequency, and wherein the switching frequency is not lower than the lower limit frequency in the DCM.

17. The flyback power converter circuit of claim 16, further comprising:

a feedback circuit, which is configured to operably generate the feedback compensation signal according to the output current;

wherein the conversion control circuit is configured to operably determine the frequency lower limit masking period according to the feedback compensation signal.

18. The flyback power converter circuit of claim 16, wherein the power transformer furtherer includes: an auxiliary winding, which is configured to operably sense the voltage across the primary side switch, so as to generate an auxiliary signal, thereby obtaining information of the ringing signal.

19. The flyback power converter circuit of claim 16, wherein during the lower limit selection period, the conversion control circuit is configured to operably select a first valley or a valley of a predetermined serial number among the one or more valleys in the ringing signal as the lower limit locked valley.

20. The flyback power converter circuit of claim 16, wherein the conversion control circuit includes:

a frequency lower limit masking circuit, which is configured to operably obtain a turned-ON time point of the primary side switch according to the switching signal, wherein the frequency lower limit masking circuit is configured to operably calculate the frequency lower limit masking period according to the feedback compensation signal, so as to generate a frequency lower limit masking signal, wherein the feedback compensation signal is related to the output current;

a valley detection circuit, which is configured to operably generate a valley detection signal according to the ringing signal, wherein the valley detection signal is indicative of an occurrence time point of at least one valley in the ringing signal during the dead time;

a lower limit determination circuit, which is configured to operably select a valley of a predetermined serial number as the occurrence time point of the lower limit locked valley according to the frequency lower limit masking signal and the valley detection signal during the lower limit selection period, so as to generate a lower limit determination signal; and a switching signal generation circuit, which is configured to operably compare the feedback compensation signal with a ramp signal, so as to generate a reset signal, and to operably generate the switching signal according to the reset signal and the lower limit determination signal.

21. The flyback power converter circuit of claim 20, wherein the switching signal generation circuit includes:

a comparison circuit, which is configured to operably compare the feedback compensation signal with the ramp signal, so as to generate a comparison signal; wherein the ramp signal is correlated to a primary side current flowing through the primary side winding; and a logic circuit, which is configured to operably generate the switching signal according to the comparison signal and the lower limit determination signal.

22. A conversion control circuit for use in a flyback power converter circuit, wherein the flyback power converter circuit is configured to operably generate a switching signal for controlling a primary side switch, so as to control the primary side winding of a power transformer of the flyback power converter circuit, thereby converting an input power to an output power at a secondary side winding of the power transformer; the conversion control circuit comprising:

a frequency lower limit masking circuit, which is configured to operably obtain a turned-ON time point according to the switching signal, wherein in a discontinuous conduction mode (DCM), during a dead time, the frequency lower limit masking circuit is configured to operably obtain a frequency lower limit masking period according to a reciprocal of the lower limit frequency, so as to generate a frequency lower limit masking signal, wherein the frequency lower limit masking period is a period starting from a time point at which the primary side switch begins to be turned ON;

a valley detection circuit, which is configured to operably generate a valley detection signal according to a ringing signal related to a voltage across the primary side switch, wherein the valley detection signal is indicative of an occurrence time point of at least one valley in the ringing signal during the dead time;

a lower limit determination circuit, which is configured to operably select a valley of a predetermined serial number as the occurrence time point of the lower limit locked valley according to the frequency lower limit masking signal and the valley detection signal during a lower limit selection period, so as to generate a lower limit determination signal, wherein the lower limit selection period is a period prior to a time point at which the frequency lower limit masking period ends; and a switching signal generation circuit, which is configured to operably compare the feedback compensation signal with a ramp signal, so as to generate a reset signal, and to operably generate the switching signal according to the reset signal and the lower limit determination signal, so that the conversion control circuit once again turns ON the primary side switch at an occurrence time point of the lower limit locked valley;

wherein the frequency lower limit masking period is inversely correlated to a level of the output current;

wherein a switching period is defined as a period between turned-ON time points of the primary side switch at two immediately consecutive cycles;

wherein the conversion control circuit is configured to operably adjust an ON period of the primary side switch according to the feedback compensation signal, so as to regulate the output voltage or the output current;

wherein a reciprocal of the switching period is defined as a switching frequency, and wherein the switching frequency is not lower than the lower limit frequency in the DCM.

23. The conversion control circuit of claim 22, further comprising:
a feedback circuit, which is configured to operably generate the feedback compensation signal according to the output current;
wherein the conversion control circuit is configured to operably determine the frequency lower limit masking period according to the feedback compensation signal.

24. The conversion control circuit of claim 22, wherein the power transformer furtherer includes: an auxiliary winding, which is configured to operably sense the voltage across the primary side switch, so as to generate an auxiliary signal, thereby obtaining information of the ringing signal.

25. The conversion control circuit of claim 22, wherein during the lower limit selection period, the conversion control circuit is configured to operably select a first valley or a valley of a predetermined serial number among the one or more valleys in the ringing signal as the lower limit locked valley.

26. The conversion control circuit of claim 22, wherein the switching signal generation circuit includes:
a comparison circuit, which is configured to operably compare the feedback compensation signal with the ramp signal, so as to generate a comparison signal; wherein the ramp signal is correlated to a primary side current flowing through the primary side winding; and
a logic circuit, which is configured to operably generate the switching signal according to the comparison signal and the lower limit determination signal.

27. A control method, which is configured to operably control a flyback power converter circuit, so that an input power is converted to an output power, thus supplying the output power to a load circuit; the control method comprising:
generating a switching signal according to a feedback compensation signal, so as to control the primary side switch and thereby controlling the primary side winding, to convert the input power to the output power at a secondary side winding of the power transformer;
in a case wherein the flyback power converter circuit operates in a discontinuous conduction mode (DCM), during a dead time in the DCM, calculating a lower limit frequency corresponding to the output current according to a frequency lower limit function, and obtaining a frequency lower limit masking period according to a reciprocal of the lower limit frequency, wherein the frequency lower limit masking period is a period starting from a time point at which the primary side switch begins to be turned ON;
during a lower limit selection period, selecting a valley among one or more valleys in a ringing signal related to a voltage across the primary side switch as a lower limit locked valley, so as to once again turn ON the primary side switch at an occurrence time point of the lower limit locked valley, wherein the lower limit selection period is a period prior to a time point at which the frequency lower limit masking period ends; and
adjusting an ON period of the primary side switch according to the feedback compensation signal, so as to regulate the output voltage or the output current;
wherein the frequency lower limit masking period is inversely correlated to a level of the output current;
wherein a switching period is defined as a period between turned-ON time points of the primary side switch at two immediately consecutive cycles;
wherein a reciprocal of the switching period is defined as a switching frequency, and wherein the switching frequency is not lower than the lower limit frequency in the DCM.

28. The control method of claim 27, further comprising:
generating the feedback compensation signal according to the output current;
determining the frequency lower limit masking period according to the feedback compensation signal.

29. The control method of claim 27, further comprising:
sensing the voltage across the primary side switch, so as to generate an auxiliary signal, thereby obtaining information of the ringing signal.

30. The control method of claim 27, wherein during the lower limit selection period, selecting a first valley or a valley of a predetermined serial number among the one or more valleys in the ringing signal as the lower limit locked valley.

31. A flyback power converter circuit, which is configured to operably convert an input power to an output power, so as to supply the output power to a load circuit, wherein the input power includes an input voltage and an input current, whereas, the output power includes an output voltage and an output current; the flyback power converter circuit comprising:
a power transformer, which is coupled between the input voltage and the output voltage via electromagnetic induction, wherein the power transformer includes: a primary side winding coupled to the input voltage and a secondary side winding coupled to the output voltage;
a primary side switch coupled to the primary side winding, wherein the primary side switch is configured to operably control the primary side winding, so as to convert the input voltage, whereby the secondary side winding generates the output voltage; and
a conversion control circuit, which is configured to operably generate a switching signal according to a feedback compensation signal, so as to control the primary side switch, thus controlling the primary side winding;
wherein in a discontinuous conduction mode (DCM), during a dead time, the conversion control circuit is configured to operably calculate an upper limit frequency corresponding to the output current according to a frequency upper limit function, and to operably obtain a frequency upper limit masking period according to a reciprocal of the upper limit frequency, wherein the frequency upper limit masking period is a period starting from a time point at which the primary side switch begins to be turned ON;
wherein in DCM, during the dead time, the conversion control circuit is configured to operably calculate a lower limit frequency corresponding to the output current according to a frequency lower limit function, and to operably obtain a frequency lower limit masking period according to a reciprocal of the lower limit frequency, wherein the frequency lower limit masking period is a period starting from a time point at which the primary side switch begins to be turned ON;
wherein the frequency upper limit masking period is inversely correlated to a level of the output current;
wherein the frequency lower limit masking period is inversely correlated to the level of the output current;
wherein a switching period is defined as a period between turned-ON time points of the primary side switch at two immediately consecutive cycles;
wherein the conversion control circuit is configured to operably adjust an ON period of the primary side switch according to the feedback compensation signal, so as to regulate the output voltage or the output current;
wherein a reciprocal of the switching period is defined as a switching frequency, and wherein the switching frequency is not higher than the upper limit frequency in the DCM;
wherein the switching frequency is not lower than the lower limit frequency in the DCM;
wherein when an occurrence number of one or more valleys in a ringing signal related to a voltage across the primary side switch during the frequency upper limit masking period is not lower than an occurrence number of one or more valleys in the ringing signal during a previous frequency upper limit masking period in a previous switching period, during an upper limit selection period, the conversion control circuit is configured to operably select a valley among the one or more valleys in the ringing signal of the present switching period as an upper limit locked valley, so that the conversion control circuit once again turns ON the primary side switch at an occurrence time point of the upper limit locked valley, wherein the upper limit selection period is a period starting from a time point at which the frequency upper limit masking period ends;
wherein when an occurrence number of one or more valleys in the ringing signal related to the voltage across the primary side switch during the frequency upper limit masking period is lower than an occurrence number of one or more valleys in the ringing signal during a previous frequency upper limit masking period in a previous switching period, during a lower limit selection period, the conversion control circuit is configured to operably select a valley among the one or more valleys in the ringing signal of the present switching period as a lower limit locked valley, so that the conversion control circuit once again turns ON the primary side switch at an occurrence time point of the lower limit locked valley, wherein the lower limit selection period is a period prior to a time point at which the frequency lower limit masking period ends.

32. The flyback power converter circuit of claim 31, further comprising:
a feedback circuit, which is configured to operably generate the feedback compensation signal according to the output current;
wherein the conversion control circuit is configured to operably determine the frequency upper limit masking period and the frequency lower limit masking period according to the feedback compensation signal.

33. The flyback power converter circuit of claim 31, wherein the power transformer furtherer includes: an auxiliary winding, which is configured to operably sense the voltage across the primary side switch, so as to generate an auxiliary signal, thereby obtaining information of the ringing signal.

34. The flyback power converter circuit of claim 31, wherein when the occurrence number of the one or more valleys in the ringing signal during the frequency upper limit masking period is not lower than the occurrence number of valleys in the ringing signal during the previous frequency upper limit masking period in the previous switching period, during the upper limit selection period, the conversion control circuit is configured to operably select a first valley or a valley of a predetermined serial number among one or more valleys in the ringing signal as the upper limit locked valley;
wherein when the occurrence number of the one or more valleys in the ringing signal during the frequency upper limit masking period is lower than the occurrence number of valleys in the ringing signal during the previous frequency upper limit masking period in the previous switching period, during the lower limit selection period, the conversion control circuit is configured to operably select the first valley or the valley of the predetermined serial number among one or more valleys in the ringing signal as the lower limit locked valley.

35. The flyback power converter circuit of claim 31, wherein the conversion control circuit includes:
a frequency upper limit masking circuit, which is configured to operably obtain a turned-ON time point according to the switching signal, and to operably calculate the frequency upper limit masking period according to the feedback compensation signal, so as to generate a frequency upper limit masking signal, wherein the feedback compensation signal is related to the output current;
a frequency lower limit masking circuit, which is configured to operably obtain the turned-ON time point according to the switching signal, and to operably calculate the frequency lower limit masking period according to the feedback compensation signal which is related to the output current, so as to generate a frequency lower limit masking signal;
a valley detection circuit, which is configured to operably generate a valley detection signal according to the ringing signal, wherein the valley detection signal is indicative of an occurrence time point of at least one valley in the ringing signal during the dead time;
a determination circuit, which is configured to operably determine whether the occurrence number of one or more valleys in the ringing signal during the frequency upper limit masking period is lower than the occurrence number of valleys in the ringing signal during the previous switching period according to the frequency upper limit masking signal, the frequency lower limit masking signal and the valley detection signal, so as to generate a determination signal; and
a switching signal generation circuit, which is configured to operably compare the feedback compensation signal with a ramp signal, so as to generate a reset signal, and to operably generate the switching signal according to the reset signal and the determination signal.

36. The flyback power converter circuit of claim 35, wherein the switching signal generation circuit includes:
a comparison circuit, which is configured to operably compare the feedback compensation signal with the ramp signal, so as to generate a comparison signal; wherein the ramp signal is correlated to a primary side current flowing through the primary side winding; and
a logic circuit, which is configured to operably generate the switching signal according to the comparison signal and the determination signal.

37. The flyback power converter circuit of claim 31, wherein the frequency upper limit function and the frequency lower limit function are both linear function of frequency versus output current, and wherein a slope of the frequency upper limit function is greater than a slope of the frequency lower limit function.

38. The flyback power converter circuit of claim 31, wherein when the occurrence number of the one or more valleys in the ringing signal during the frequency upper limit masking period is lower than the occurrence number of valleys in the ringing signal during the previous frequency upper limit masking period in the previous switching period, the conversion control circuit is configured to operably calculate an auxiliary frequency corresponding to the output current according to a frequency auxiliary function, and to operably obtain a frequency auxiliary masking period according to a reciprocal of the auxiliary frequency, wherein the frequency auxiliary masking period is a period starting from the time point at which the primary side switch begins to be turned ON, and wherein during an auxiliary selection period, the conversion control circuit is configured to operably select the lower limit locked valley, so that the conversion control circuit once again turns ON the primary side switch at the occurrence time point of the lower limit locked valley, wherein the auxiliary selection period is a period starting from a time point at which the frequency auxiliary masking period ends;

wherein the frequency auxiliary masking period is between the frequency upper limit masking period and the frequency lower limit masking period.

39. A conversion control circuit for use in a flyback power converter circuit, wherein the flyback power converter circuit is configured to operably generate a switching signal for controlling a primary side switch, so as to control the primary side winding of a power transformer of the flyback power converter circuit, thereby converting an input power to an output power at a secondary side winding of the power transformer; the conversion control circuit comprising:

a frequency upper limit masking circuit, which is configured to operably obtain a turned-ON time point according to the switching signal, wherein in a discontinuous conduction mode (DCM), during a dead time, the frequency upper limit masking circuit is configured to operably obtain a frequency upper limit masking period according to a reciprocal of the upper limit frequency, so as to generate a frequency upper limit masking signal, wherein the frequency upper limit masking period is a period starting from a time point at which the primary side switch begins to be turned ON;

a frequency lower limit masking circuit, which is configured to operably obtain the turned-ON time point according to the switching signal, wherein in the DCM, during the dead time, the frequency lower limit masking circuit is also configured to operably obtain a frequency lower limit masking period according to a reciprocal of the lower limit frequency, so as to generate a frequency lower limit masking signal, wherein the frequency lower limit masking period is a period starting from the time point at which the primary side switch begins to be turned ON;

a valley detection circuit, which is configured to operably generate a valley detection signal according to a ringing signal related to a voltage across the primary side switch, wherein the valley detection signal is indicative of an occurrence time point of at least one valley in the ringing signal during the dead time;

a determination circuit, which is configured to operably determine whether the occurrence number of one or more valleys in the ringing signal during the frequency upper limit masking period is lower than the occurrence number of valleys in the ringing signal during a previous switching period according to the frequency upper limit masking signal, the frequency lower limit masking signal and the valley detection signal, so as to generate a determination signal;

a switching signal generation circuit, which is configured to operably compare the feedback compensation signal with a ramp signal, so as to generate a reset signal, wherein the switching signal generation circuit is configured to operably generate the switching signal according to the reset signal and the determination signal, so that the conversion control circuit once again turns ON the primary side switch at an occurrence time point of the upper limit locked valley;

wherein the frequency upper limit masking period is inversely correlated to a level of the output current;

wherein the frequency lower limit masking period is inversely correlated to a level of the output current;

wherein a switching period is defined as a period between turned-ON time points of the primary side switch at two immediately consecutive cycles;

wherein the conversion control circuit is configured to operably adjust an ON period of the primary side switch according to the feedback compensation signal, so as to regulate the output voltage or the output current;

wherein a reciprocal of the switching period is defined as a switching frequency, and wherein the switching frequency is not higher than the upper limit frequency in the DCM;

wherein the switching frequency is not lower than the lower limit frequency in the DCM;

wherein when an occurrence number of one or more valleys in a ringing signal related to a voltage across the primary side switch during the frequency upper limit masking period is not lower than an occurrence number of valleys in the ringing signal during a previous frequency upper limit masking period in the previous switching period, during an upper limit selection period, the conversion control circuit is configured to operably select a valley among one or more valleys in the ringing signal as an upper limit locked valley, so that the conversion control circuit once again turns ON the primary side switch at an occurrence time point of the upper limit locked valley, wherein the upper limit selection period is a period starting from a time point at which the frequency upper limit masking period ends;

wherein when an occurrence number of one or more valleys in the ringing signal during the frequency upper limit masking period is lower than an occurrence number of valleys in the ringing signal during the previous frequency upper limit masking period in the previous switching period, during a lower limit selection period, the conversion control circuit is configured to operably select a valley among one or more valleys in the ringing signal as a lower limit locked valley, so that the conversion control circuit once again turns ON the primary side switch at an occurrence time point of the lower limit locked valley, wherein the lower limit selection period is a period prior to a time point at which the frequency lower limit masking period ends.

40. The conversion control circuit of claim 39, further comprising:

a feedback circuit, which is configured to operably generate the feedback compensation signal according to the output current;

wherein the conversion control circuit is configured to operably determine the frequency upper limit masking period and the frequency lower limit masking period according to the feedback compensation signal.

41. The conversion control circuit of claim 39, wherein the power transformer furtherer includes: an auxiliary winding, which is configured to operably sense the voltage across the primary side switch, so as to generate an auxiliary signal, thereby obtaining information of the ringing signal.

42. The conversion control circuit of claim 39, wherein when the occurrence number of the one or more valleys in the ringing signal during the frequency upper limit masking period is not lower than the occurrence number of valleys in the ringing signal during the previous frequency upper limit masking period in the previous switching period, during the upper limit selection period, the conversion control circuit is configured to operably select a first valley or a valley of a predetermined serial number among one or more valleys in the ringing signal as the upper limit locked valley;

wherein when the occurrence number of the one or more valleys in the ringing signal during the frequency upper limit masking period is lower than the occurrence number of valleys in the ringing signal during the previous frequency upper limit masking period in the previous switching period, during the lower limit selection period, the conversion control circuit is configured to operably select the first valley or the valley of the predetermined serial number among one or more valleys in the ringing signal as the lower limit locked valley.

43. The conversion control circuit of claim 39, wherein the switching signal generation circuit includes:

a comparison circuit, which is configured to operably compare the feedback compensation signal with the ramp signal, so as to generate a comparison signal; wherein the ramp signal is correlated to a primary side current flowing through the primary side winding; and a logic circuit, which is configured to operably generate the switching signal according to the comparison signal and the determination signal.

44. The conversion control circuit of claim 39, wherein the frequency upper limit function and the frequency lower limit function are both linear function of frequency versus output current, and wherein a slope of the frequency upper limit function is greater than a slope of the frequency lower limit function.

45. The conversion control circuit of claim 39, wherein when the occurrence number of the one or more valleys in the ringing signal during the frequency upper limit masking period is lower than the occurrence number of valleys in the ringing signal during the previous frequency upper limit masking period in the previous switching period, the conversion control circuit is configured to operably calculate an auxiliary frequency corresponding to the output current according to a frequency auxiliary function, and to operably obtain a frequency auxiliary masking period according to a reciprocal of the auxiliary frequency, wherein the frequency auxiliary masking period is a period starting from the time point at which the primary side switch begins to be turned ON, and wherein during an auxiliary selection period, the conversion control circuit is configured to operably select the lower limit locked valley, so that the conversion control circuit once again turns ON the primary side switch at the occurrence time point of the lower limit locked valley, wherein the auxiliary selection period is a period starting from a time point at which the frequency auxiliary masking period ends;

wherein the frequency auxiliary masking period is between the frequency upper limit masking period and the frequency lower limit masking period.

46. A control method, which is configured to operably control a flyback power converter circuit, so that an input power is converted to an output power, thus supplying the output power to a load circuit; the control method comprising:

generating a switching signal according to a feedback compensation signal, so as to control the primary side switch and thereby controlling the primary side winding, to convert the input power to the output power at a secondary side winding of the power transformer;

in a case wherein the flyback power converter circuit operates in a discontinuous conduction mode (DCM), during a dead time in the DCM, calculating an upper limit frequency corresponding to the output current according to a frequency upper limit function, and obtaining a frequency upper limit masking period according to a reciprocal of the upper limit frequency, wherein the frequency upper limit masking period is a period starting from a time point at which the primary side switch begins to be turned ON;

in a case wherein the flyback power converter circuit operates in a discontinuous conduction mode (DCM), during a dead time in the DCM, calculating a lower limit frequency corresponding to the output current according to a frequency lower limit function, and obtaining a frequency lower limit masking period according to a reciprocal of the lower limit frequency, wherein the frequency lower limit masking period is a period starting from the time point at which the primary side switch begins to be turned ON;

wherein when an occurrence number of one or more valleys in a ringing signal related to a voltage across the primary side switch during the frequency upper limit masking period is not lower than an occurrence number of valleys in the ringing signal during a previous frequency upper limit masking period in a previous switching period, during an upper limit selection period, selecting a valley among one or more valleys in the ringing signal as an upper limit locked valley, so that the primary side switch is once again turned ON at an occurrence time point of the upper limit locked valley, wherein the upper limit selection period is a period starting from a time point at which the frequency upper limit masking period ends;

wherein when an occurrence number of one or more valleys in the ringing signal during the frequency upper limit masking period is lower than an occurrence number of valleys in the ringing signal during the previous frequency upper limit masking period in the previous switching period, during a lower limit selection period, selecting a valley among one or more valleys in the ringing signal of the voltage across the primary side switch as a lower limit locked valley, so that the primary side switch is once again turned ON at an occurrence time point of the lower limit locked valley, wherein the lower limit selection period is a period prior to a time point at which the frequency lower limit masking period ends; and adjusting an ON period of the primary side switch according to the feedback compensation signal, so as to regulate the output voltage or the output current;

wherein the frequency upper limit masking period is inversely correlated to a level of the output current;

wherein the frequency lower limit masking period is inversely correlated to a level of the output current;

wherein a switching period is defined as a period between turned-ON time points of the primary side switch at two immediately consecutive cycles;

wherein the conversion control circuit is configured to operably adjust an ON period of the primary side switch according to the feedback compensation signal, so as to regulate the output voltage or the output current;

wherein a reciprocal of the switching period is defined as a switching frequency, and wherein the switching frequency is not higher than the upper limit frequency in the DCM;

wherein the switching frequency is not lower than the lower limit frequency in the DCM.

47. The control method of claim 46, further comprising:
generating the feedback compensation signal according to the output current;
determining the frequency upper limit masking period and the frequency lower limit masking period according to the feedback compensation signal.

48. The control method of claim 46, further comprising:
sensing the voltage across the primary side switch, so as to generate an auxiliary signal, thereby obtaining information of the ringing signal.

49. The control method of claim 46, wherein when the occurrence number of the one or more valleys in the ringing signal during the frequency upper limit masking period is not lower than the occurrence number of valleys in the ringing signal during the previous frequency upper limit masking period in the previous switching period, during the upper limit selection period, selecting a first valley or a valley of a predetermined serial number among one or more valleys in the ringing signal as the upper limit locked valley;

wherein when the occurrence number of the one or more valleys in the ringing signal during the frequency upper limit masking period is lower than the occurrence number of valleys in the ringing signal during the previous frequency upper limit masking period in the previous switching period, during the lower limit selection period, selecting the first valley or the valley of the predetermined serial number among one or more valleys in the ringing signal as the lower limit locked valley.

50. The control method of claim 46, wherein the frequency upper limit function and the frequency lower limit function are both linear function of frequency versus output current, and wherein a slope of the frequency upper limit function is greater than a slope of the frequency lower limit function.

* * * * *